(12) United States Patent
Ubillos et al.

(10) Patent No.: US 8,971,617 B2
(45) Date of Patent: Mar. 3, 2015

(54) METHOD AND INTERFACE FOR CONVERTING IMAGES TO GRAYSCALE

(71) Applicant: Apple Inc., Cupertino, CA (US)

(72) Inventors: Randy Ubillos, Los Altos, CA (US); Garrett M. Johnson, San Francisco, CA (US); Russell Y. Webb, San Jose, CA (US); Samuel M. Roberts, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 13/629,549

(22) Filed: Sep. 27, 2012

(65) Prior Publication Data

US 2013/0236091 A1  Sep. 12, 2013

Related U.S. Application Data

(60) Provisional application No. 61/607,524, filed on Mar. 6, 2012, provisional application No. 61/607,574, filed on Mar. 6, 2012.

(51) Int. Cl.
*G06K 9/00* (2006.01)
(52) U.S. Cl.
USPC ......................................................... 382/163
(58) Field of Classification Search
CPC ....... H04N 1/38; H04N 1/40012; H04N 1/56; G06K 9/00; G06T 11/001; G06K 9/38; G09G 3/20; G09G 3/2003; G09G 3/2059; G09G 3/3413; G09G 5/02; G09G 5/06
See application file for complete search history.

(56) References Cited

U.S. PATENT DOCUMENTS

| 6,778,186 | B2 | 8/2004 | Mehigan |
| 7,034,881 | B1 | 4/2006 | Hyodo et al. |
| 7,382,915 | B2 * | 6/2008 | Bala et al. ..................... 382/162 |
| 7,489,305 | B2 | 2/2009 | Salisbury et al. |
| 7,598,964 | B2 | 10/2009 | Olson |
| 7,675,648 | B2 | 3/2010 | Ernst et al. |
| 7,706,606 | B1 | 4/2010 | Ruzon et al. |
| 7,920,739 | B2 * | 4/2011 | Chien et al. ................... 382/162 |
| 7,954,067 | B2 | 5/2011 | Breglio |
| 8,139,080 | B2 | 3/2012 | Relyea et al. |

(Continued)

FOREIGN PATENT DOCUMENTS

WO  WO 2007/145654  12/2007

OTHER PUBLICATIONS

Author Unknown, "How to Manage and Work with Digital Images, Using FastStone Image Viewer Version 4.5," FastStone Soft, Jun. 10, 2011, pp. 1-95.

(Continued)

*Primary Examiner* — Jose Couso
(74) *Attorney, Agent, or Firm* — Adeli LLP

(57) ABSTRACT

A method and apparatus for generating a grayscale image. The method and apparatus receive a single value. From the single value, the method and apparatus generate a set of grayscale weighting values. The method and apparatus generate the grayscale based on a color image and the set of grayscale weighting values. By limiting the number of values to a single value, the method and apparatus prevents a user from arbitrarily selecting a number of possible weighting values which could result in a grayscale image that is too dim or too bright. This single control method and apparatus quickly and efficiently produces a grayscale image that is neither too bright nor too dim.

25 Claims, 18 Drawing Sheets

(56) References Cited

U.S. PATENT DOCUMENTS

| | | | |
|---|---|---|---|
| 8,355,566 B2 * | 1/2013 | Ng | 382/162 |
| 8,526,719 B2 * | 9/2013 | Lee et al. | 382/163 |
| 8,594,419 B2 * | 11/2013 | Majewicz et al. | 382/162 |
| 8,660,345 B1 * | 2/2014 | Fang et al. | 382/166 |
| 2003/0103057 A1 | 6/2003 | Graves et al. | |
| 2008/0056564 A1 | 3/2008 | Lindbloom | |
| 2008/0225058 A1 | 9/2008 | Hertzfeld et al. | |
| 2009/0204913 A1 | 8/2009 | Kawano et al. | |
| 2010/0230493 A1 | 9/2010 | Akiyama | |
| 2011/0182511 A1 | 7/2011 | Chien et al. | |
| 2011/0219329 A1 | 9/2011 | Breglio | |

OTHER PUBLICATIONS

Benedetti, Luca, et al., "Color to Gray Conversions in the Context of Stereo Matching Algorithms," Machine Vision and Applications, Dec. 7, 2010, pp. 1-32.

O'Neil, Steve, "Using Adobe Photoshop," Chapter 7—Image Adjustments, Month Unknown, 2006, pp. 1-12.

* cited by examiner

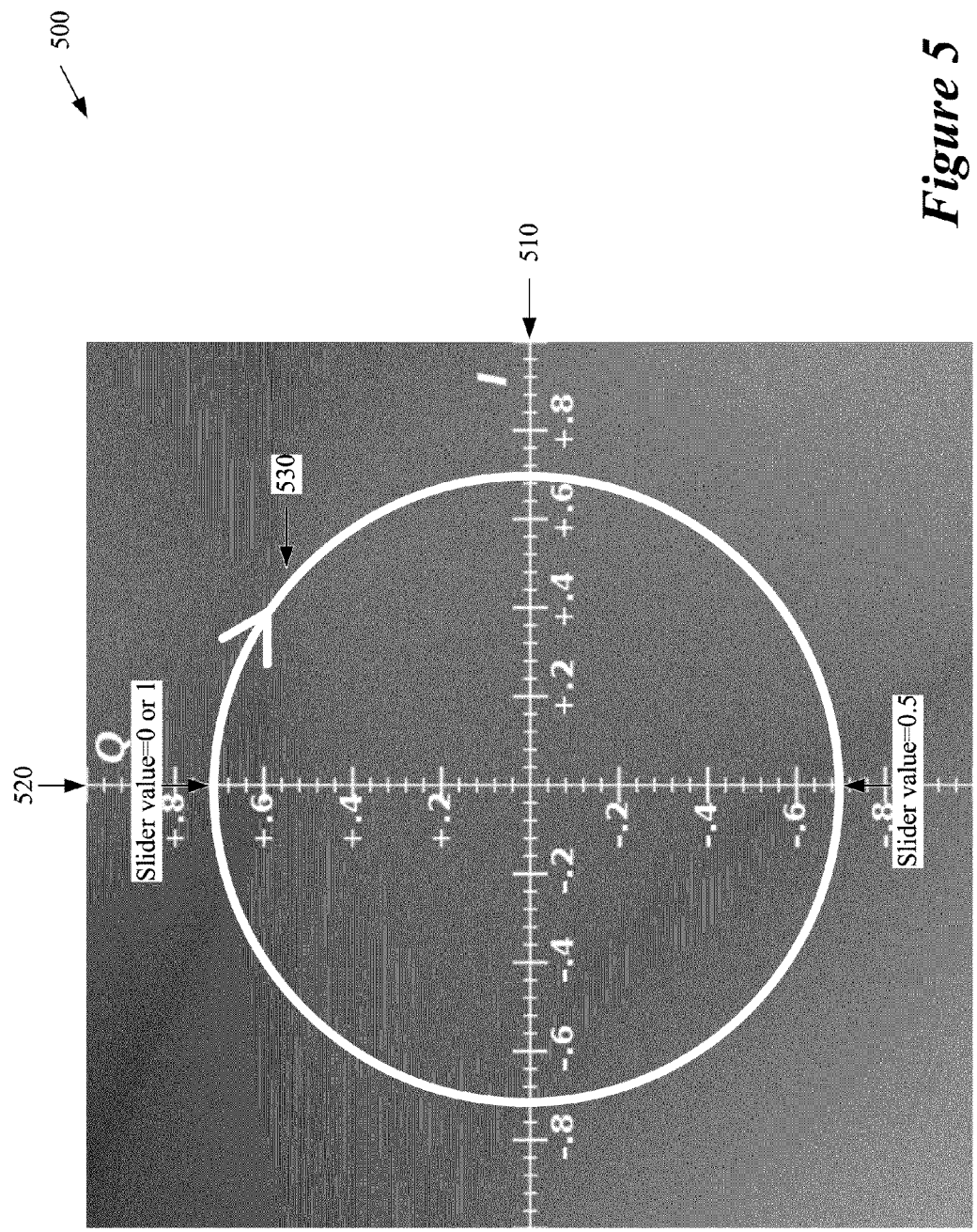

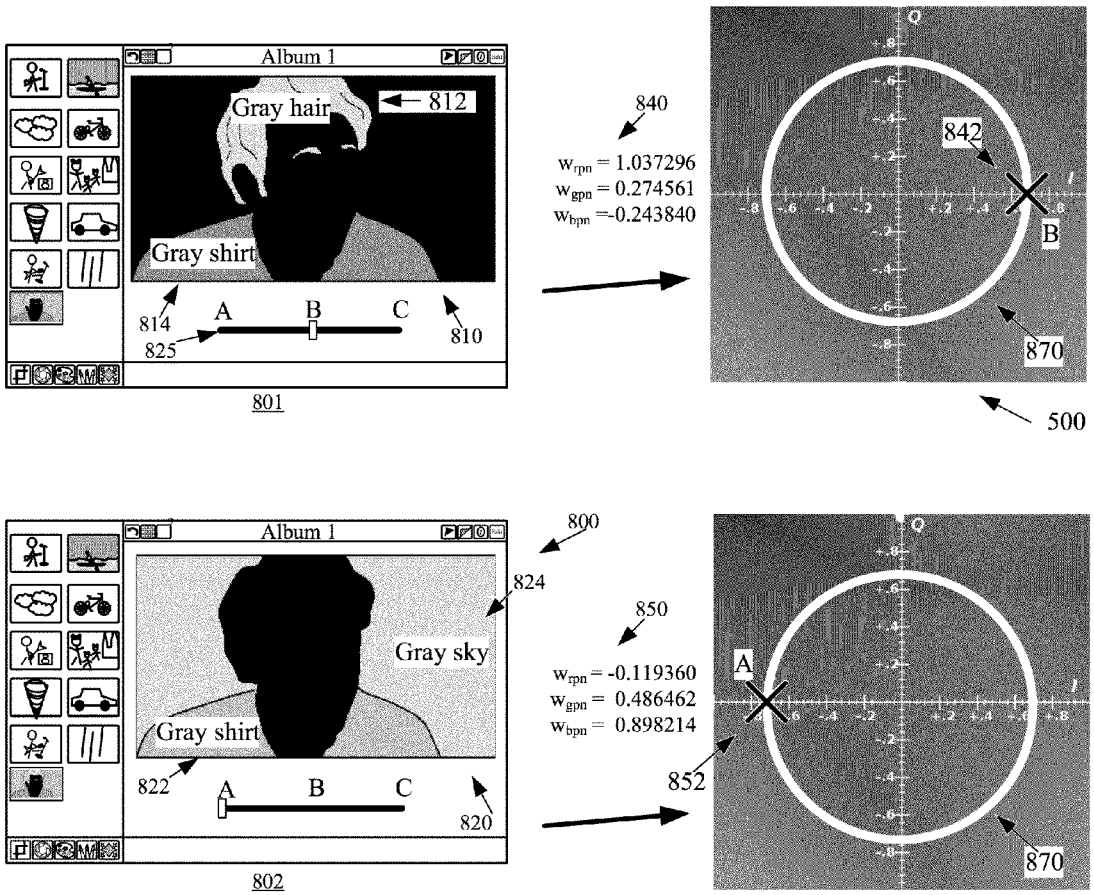
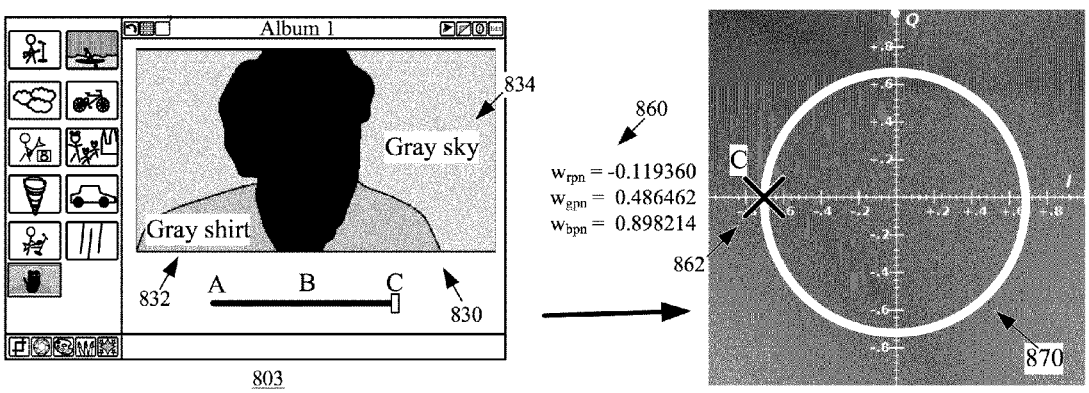
*Figure 8*

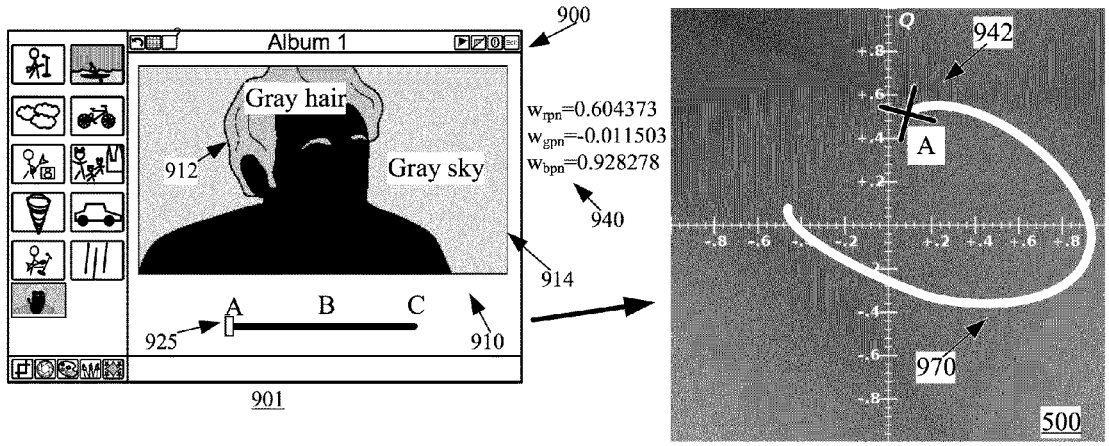
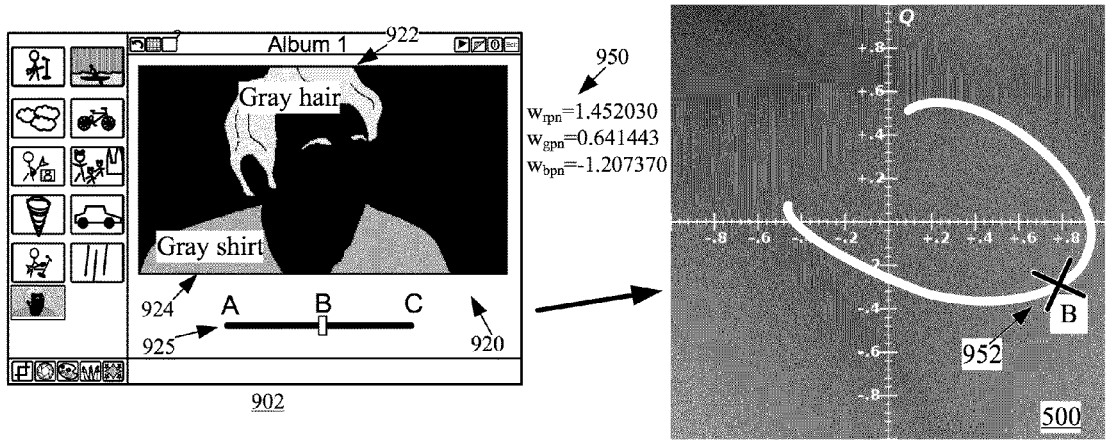
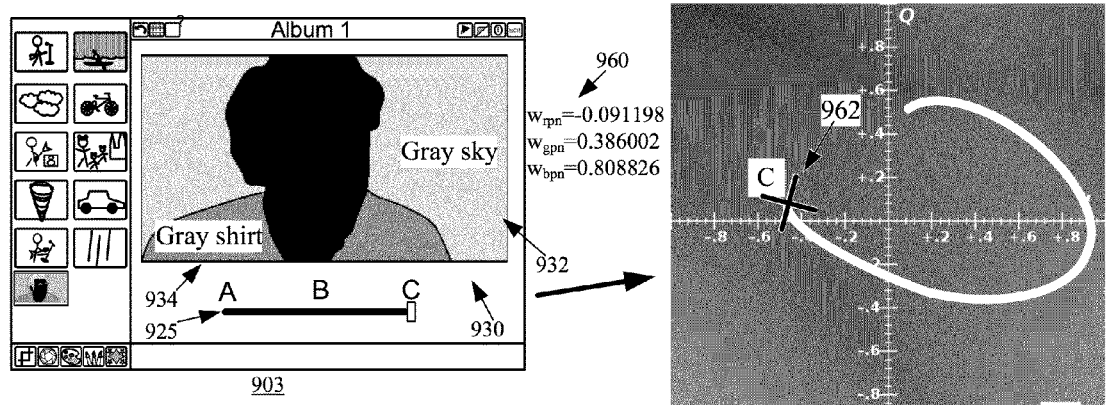
*Figure 9*

METHOD AND INTERFACE FOR CONVERTING IMAGES TO GRAYSCALE

CLAIM OF BENEFIT TO PRIOR APPLICATIONS

This application claims the benefit of U.S. Provisional Patent Application 61/607,524 entitled "Method and Interface for Converting Images to Grayscale," filed Mar. 6, 2012 and U.S. Provisional Patent Application 61/607,574 entitled "Media Editing Application with Robust Tools," filed Mar. 6, 2012. The contents of U.S. Provisional Patent Applications 61/607,524 and 61/607,574 are incorporated herein by reference.

BACKGROUND

Digital images can be color (e.g., made up of red, green, and blue components) or black and white (e.g., grayscale). Many image editing applications have the ability to convert color images to black and white (grayscale) images. Such image editing applications generate a luminance (or brightness) for each pixel based on a weighted sum of the levels of green, blue, and red in the pixel. However, most of these applications have pre-set weights for their conversion functions. Such applications do not provide an option for the user to alter the weights for the conversion functions. Some image editing applications do allow the user to adjust the weights for conversion functions. However, such prior art image editing applications give the user too many options by allowing any of the weights to be set independently. The results of setting all three weights to arbitrary levels are often poor. Therefore, there is a need in the art for an image editing application that gives a user some control over grayscale conversion, but constrains the weighting to values that produce acceptable results.

BRIEF SUMMARY

Some embodiments described herein provide an image editing application that receives a color image and a setting on a grayscale conversion control. The setting provides a single value which is then used to determine weighting values for converting the color image to grayscale. In some embodiments, the weighting values are determined by applying the single value to a parameterized path in a color space (e.g., YIQ color space) to determine a particular point in that color space. This particular point is then converted to weighting values appropriate to the color space of the original image. For example, red, green, and blue weighting values ($w_r$, $w_g$, and $w_b$) are generated to convert an original image that uses an RGB color space. In some embodiments, the image editing applications generate these weighting values by using a transformation matrix between the color space with the parameterized path and the RGB color space.

The total weight (sum of the three weights) of $w_r$, $w_g$, and $w_b$ varies at different points along the parameterized path in some embodiments. If the total weight is large, most images will become brighter during the conversion to grayscale. If the total weight is small, most images will become darker during the conversion to grayscale. To reduce the effects of brightening or darkening during conversions, the image editing application of some embodiments normalizes the weighting values. In other embodiments, the image editing application partially normalizes the weights to reduce, but not eliminate, the changes in overall brightness during different conversions at different settings.

The weighting values are then applied to the original color image (e.g., an RGB color image) to convert the color image to a grayscale image. In contrast to prior art image editing applications (with multiple controls for adjusting grayscale images), the image editing applications of some embodiments provide a single control for adjusting grayscale images. By limiting the number of controls to one control, the application of some embodiments prevents a user from arbitrarily selecting a number of possible weighting values which could result in a grayscale image that is too dim or too bright. Using this single control method, the application quickly and efficiently produces a grayscale image that is neither too bright nor too dim.

The preceding Summary is intended to serve as a brief introduction to some embodiments described herein. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 5 conceptually illustrates a parameterized path used for converting a single value into chroma values in YIQ color space.

FIG. 8 illustrates an image editing application performing grayscale conversions using a different circular parameterized path.

FIG. 9 illustrates an image editing application performing grayscale conversions using an arbitrary parameterized path.

DETAILED DESCRIPTION

Figure 1:
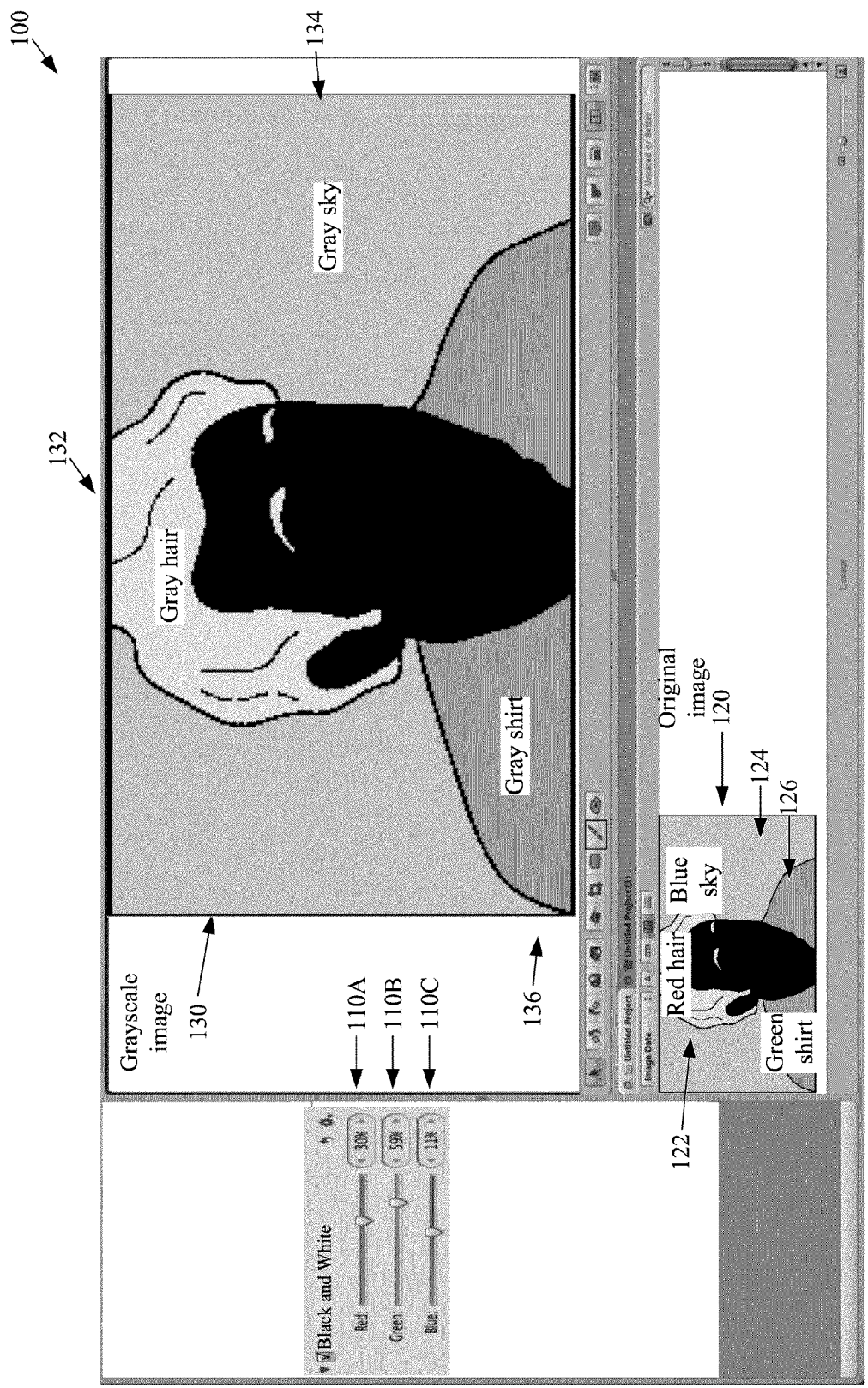
FIG. 1 illustrates a prior art image editing application with a three-control, adjustable grayscale converter.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Introduction

In a color image, the qualities (including the color and brightness) of each pixel can be represented as a three dimensional vector (r, g, b). The vector describes the red (r), blue (b), and green (g) components of the pixel. An image that is stored based on pixels that use an RGB encoding scheme can be referred to as an RGB image. A pixel in an RGB original color image can be converted to a grayscale pixel in a grayscale image by using a function of the r, g, and b components of the pixel to determine a quality of the gray pixel (e.g., the luminance) as shown in equation (1).

$$\text{luminance} = f((r,g,b)) \quad (1)$$

The function used by some embodiments for determining the luminance of a gray pixel based on the red, blue, and green levels of a color pixel is the dot product of the color vector (r, g, b) and a weighting vector $(w_r, w_g, w_b)$ as shown in equation (2). The weighting vector $(w_r, w_g, w_b)$ is a vector composed of three weighting values, each of which corresponds to one of the colors in the color vector.

$$\text{luminance} = (w_r, w_g, w_b) \cdot (r,g,b) = w_r r + w_g g + w_b b \quad (2)$$

As can be seen in equation (2) there are three color components (r, g, and b) as well as three weighting values, $w_r$, $w_g$, and $w_b$. As mentioned above, each weighting value corresponds to one color component. The $w_r$ value corresponds to the red (r) component of the pixels. The $w_g$ value corresponds to the green (g) component of the pixels and the $w_b$ value corresponds to the blue (b) component of the pixels.

Herein, the figures are described using component (r, g, and b) values that vary between 0 and 1. A pixel lacks a particular color when the corresponding color component's value is 0 for the pixel. A pixel includes a maximum value of a particular color when the corresponding color component's value is 1 for the pixel. A pixel with a value of (1, 0, 0) is as bright a red as possible. Similarly, a pixel with a value of (0, 1, 0) is as bright a green as possible and a pixel with a value of (0, 0, 1) is as bright a blue as possible. All other colors can be represented as combinations of blue, green and red. For example the brightest white pixel has a value of (1, 1, 1), the brightest yellow pixel has a value of (1, 1, 0), and a black pixel has a value of (0, 0, 0).

One of ordinary skill in the art will understand that although RGB color space is used herein as the color space of the original image, other color spaces of the original image are possible within the scope of the invention. Such other color spaces would have their own weighting values, grayscale conversion formulae, and conversions between the parameterized path color space and the color space of the image.

The described luminance values, herein, vary from 0 (black) to 1 (white). However, one of ordinary skill in the art will understand that the scales used for measuring these quantities are arbitrary and that other scales could be used within the scope of the invention. For example, color components and/or luminance in some embodiments could range from 0 to 255 or between any two values. Similarly, one of ordinary skill in the art will understand that the grayscales of some embodiments may be calculated in luma rather than luminance, and that the image editing applications of some embodiments may calculate how dark pixels are rather than how light they are.

As described herein, individual weighting values ($w_r$, $w_g$, or $w_b$) can be positive or negative. In some embodiments (e.g., embodiments where one or more weighting values are negative), pixels with a calculated luminance less than or equal to zero are converted to black pixels (luminance of 0) in the grayscale image. In some embodiments, when one or more weighting values are positive, such that the calculated luminance of a pixel is greater than or equal to 1, the pixel is converted to a white pixel (luminance of 1) in the grayscale image. Pixels with a calculated luminance value between 0 and 1 are converted to gray pixels in the grayscale image. In some embodiments, higher luminance values between the 0 (black) and 1 (white) values represent lighter shades of gray while lower luminance values represent darker shades of gray. In some embodiments, the values of the luminance are not capped. In other embodiments, the values of luminance are not capped while the image is being edited, but are capped when the image is saved in a format with a limited luminance range.

In some prior art image editing applications, the weighting values ($w_r$, $w_g$, and $w_b$) are fixed constants. That is, in such applications the user has no control over the weighting values and can decide only whether to convert a color image to grayscale or not. In other prior art image editing applications, the weighting values can be set independently with separate controls for each weighting value. Weighting values are sometimes called "weights", or "grayscale weighting sets" (or by their component names, red weighting value or red weight, green weighting value or green weight, etc.). FIG. 1 illustrates a prior art image editing application with a three-control, adjustable grayscale converter. The application allows a user to convert a color image to a grayscale image by adjusting the weighting of each color component independently. FIG. 1 includes application interface 100, grayscale controls 110A-C, original image 120 with red hair 122, blue sky 124, and green shirt 126, grayscale image 130 with gray hair 132, gray sky 134, and gray shirt 136.

Application interface 100 represents the user interface of a prior art image editing application. As described above with regard to equation (2), the luminance of a pixel in the grayscale image is determined by a weighted sum of the color components of the corresponding pixel in the original color image. The weights in the weighted sum are set by the controls. Grayscale control 110A controls $w_r$, the weighting of the red component of each color pixel when generating the corresponding grayscale pixel. Grayscale control 110B controls $w_g$, the weighting of the green component of each color pixel when generating the corresponding grayscale pixel. Grayscale control 110C controls $w_b$, the weighting of the blue component of each color pixel when generating the corresponding grayscale pixel. Original image 120 is a stylized color image of a person. The stylized image has multiple sections with pixels of different colors. The original image 120 has a section of primarily red pixels that make up the red hair 122 of the person. The original image 120 has a section of primarily blue pixels that make up the blue sky 124 of the background of the person. The original image 120 also has a section of primarily green pixels that make up the green shirt 126 of the person. Grayscale image 130 is a black, white, and gray representation of the original color image 120. Accordingly, the gray hair 132 in the grayscale image 130, corresponds to red hair 122 in the color image 120. The gray sky 134 in the grayscale image 130 corresponds to blue sky 124 in the color image 120. Gray shirt 136 in grayscale image 130 corresponds to green shirt 126 in the color image.

As previously mentioned, the prior art image editing application 100 is an image editor with three controls 110A-110C. Each control separately determines how much influence its corresponding color component of the color image 120 will have on the grayscale image 130. In some prior art image editing applications one or more weighting values can be set to either a positive or a negative value. In such embodiments, when a weight is set to be in a positive range (e.g., 50%), the higher the corresponding component value (r, g, or b) of a pixel is, the more it adds to the luminance of the corresponding grayscale pixel. Conversely, for a component with a weight set to be in a negative range (e.g., −30%), the higher the corresponding component value of a pixel is, the more it subtracts from the luminance of the corresponding grayscale pixel. In FIG. 1, the weighting values are shown as part of the slider controls and are all positive (i.e., $w_r=30\%$, $w_g=59\%$, and $w_b=11\%$). Accordingly, grayscale pixels corresponding to red pixels, green pixels, and blue pixels will all have luminance above zero (i.e., they will be gray, not black). Therefore all the pixels in areas 132, 134, and 136 of grayscale image 130 (corresponding to areas 122, 124, and 126 of original image 120, respectively) have luminosities above zero.

In the illustrated prior art image editing application, the three independent slider controls have many settings at which the grayscale image is too bright (i.e., the aggregate weight is too high) and many settings at which the grayscale image is too dim (i.e., the aggregate weight is low or negative). Another disadvantage of having three separate controls is that the grayscale converter of the prior art is somewhat redundant with other controls (e.g., bright and contrast controls).

In the sections below, Section II describes image editing applications of some embodiments with a single control for affecting conversions of color images to grayscale images. Then, Section III describes how color space parameterization is used to affect conversions of color images to grayscale images. Next, Section IV describes normalization of color weighting values. Section V then describes the effects of alternate parameterized paths of some embodiments on conversion of color images to grayscale images. Section VI describes the conversion of multi-component pixels in color images to grayscale pixels in grayscale images. Section VII next describes a software architecture of the image editing applications of some embodiments. Section VIII describes a graphical user interface of some embodiments. Section IX then describes more generally an image viewing, editing, and organization application. Finally, Section X describes some examples of electronic systems on which the image editing applications of some embodiments run.

II. Single Control Value Grayscale Conversion

Figure 2:
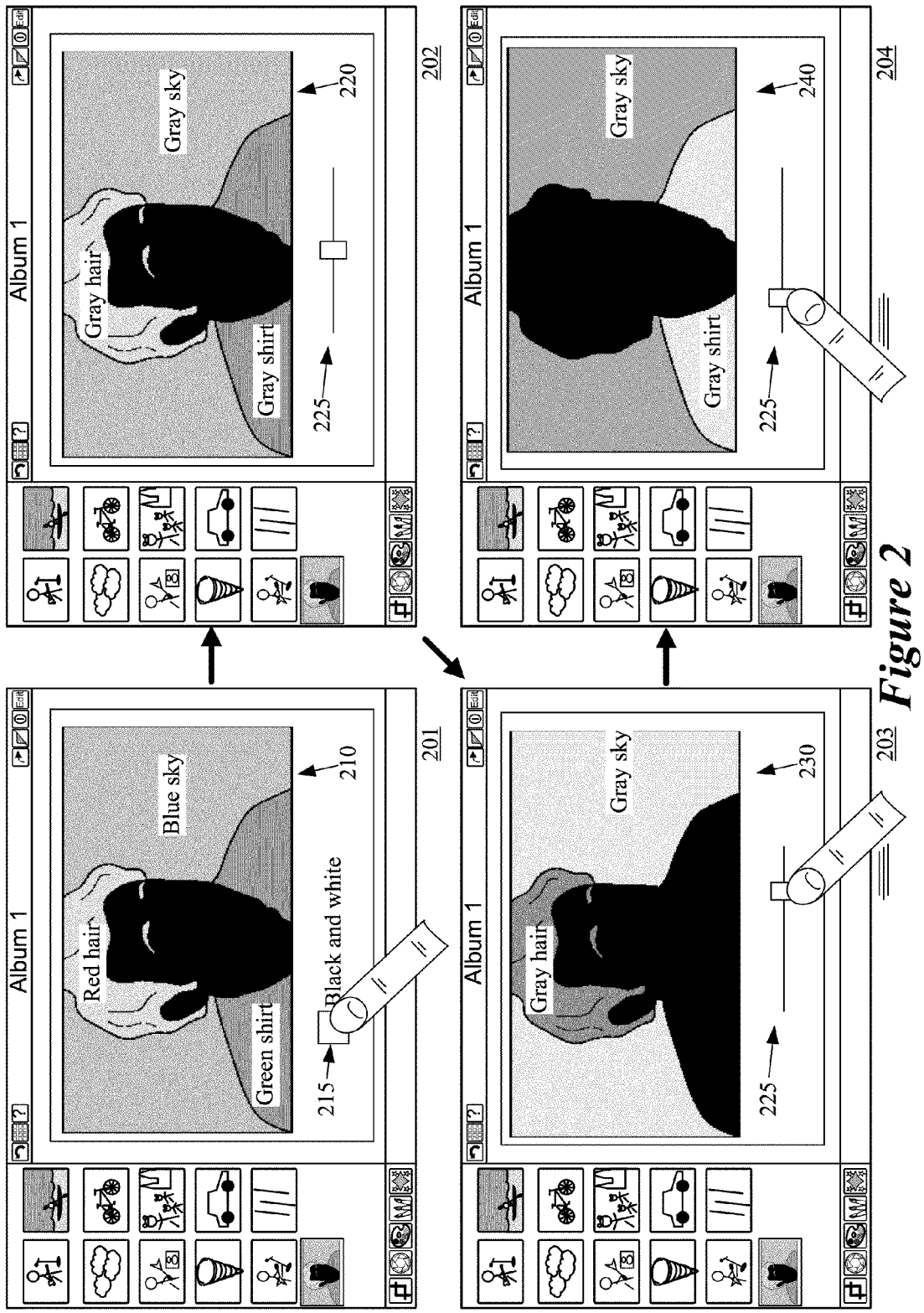
FIG. 2 illustrates an image editing application with a single-control, adjustable grayscale converter.

While the prior art applications offer either zero adjustability of the grayscale conversion or three independently adjustable weighting values, the image editing applications of some embodiments described herein provide a single control for adjusting a grayscale conversion. FIG. 2 illustrates such a single control for adjusting a grayscale conversion. In particular, FIG. 2 illustrates how moving a slider control and changing the color component values affects a grayscale conversion of a color image. FIG. 2 includes image editing application 200 in four stages 201, 202, 203, and 204, color image 210, effect selector 215, grayscale images 220, 230, and 240, and slider control 225.

Stage 201 represents the state of an image editing application 200 of some embodiments before the grayscale converter is activated. Effect selector 215 activates the grayscale conversion tool of the application 200. Stage 202 represents the state of the application 200 after the grayscale converter is activated, but with the slider control 225 in a default (center) position. Slider control 225 controls the grayscale conversion effect. Stages 203 and 204 represent the states of application 200 after slider control 225 has been moved to the right or left, respectively. Color image 210 is an original image which will be converted to grayscale by application 200. Grayscale images 220, 230, and 240 are images generated by application 200 according to the position of slider control 225.

The first stage 201 shows the application prior to the activation of the grayscale control. At this stage 201, the original image 210 is still shown in color. The control 215 activates the grayscale converter when it is selected. Selection of control 215 can be by various means including, but not limited to, clicking with a cursor controller, performing a gesture at a location on a device having a touch or near touch sensitive screen, or using a keyboard. In some embodiments, a user may select a location by tapping or placing a finger at the location. In other embodiments, other gestures may be performed to select a location.

The second stage 202 shows the state of the application just after the grayscale converter has been activated. In this stage, a default value of the grayscale conversion is used. In the illustrated embodiment, the default value is represented by a slider control 225 set to the center of the available scale of values. One of ordinary skill in the art will understand that other embodiments can use different default values. Because the grayscale converter has been activated, a grayscale image 220 has taken the place of original image 210. In the illustrated embodiment, for the default value of the slider control, all three weighting values are positive. Therefore, pixels corresponding to each of the colors in the original image 210 have positive luminance values in the converted grayscale image 220. Even though the illustrated embodiment is displaying the grayscale image 220 in the place of original image 210, in some embodiments, a copy of the original image 210 is stored in memory to provide a basis for assorted grayscale converter settings.

In the third stage 203, the slider control 225 has been moved to the right of center. In the illustrated embodiment, the position of the slider control in stage 203 corresponds to a negative value for the green weighting value. Accordingly, the area of image 230 that corresponds to the green shirt of original image 210 is black. In the third stage 203, the slider control position also corresponds to positive values for the red and blue weighting values. These values are also high enough to display gray pixels (rather than black pixels) in place of the blue and red pixels of the original color image 210.

In the fourth stage 204, the slider control 225 has been moved to the left of center. In the illustrated embodiment, the position of the slider control in stage 204 corresponds to a negative value for the red weighting value. Accordingly, the area of image 240 that corresponds to the red hair of original image 210 is black. In the fourth stage 204, the slider control position also corresponds to positive values for the green and blue weighting values. These values are also high enough to display gray pixels (rather than black pixels) in place of the green and blue pixels of the original color image 210. By limiting the controls to one slider control, the application of some embodiments prevents a user from arbitrarily selecting a number of possible weighting values which could result in a grayscale image that is too dim or too bright.

Figure 3:
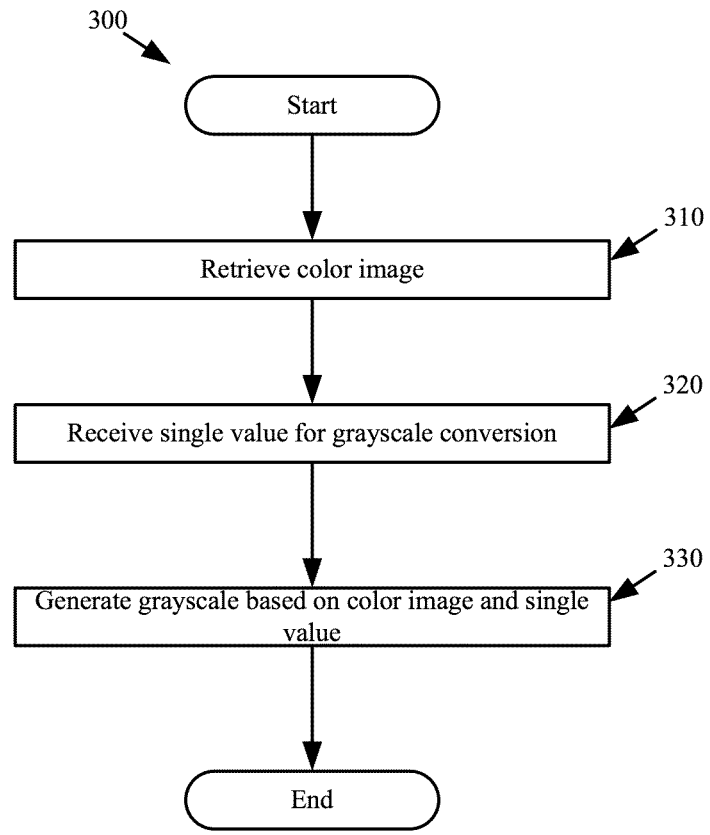
FIG. 3 conceptually illustrates a process of some embodiments for grayscale conversion based on a single control value.

The image editing application illustrated in FIG. 2 applies a process of some embodiments for generating grayscale images from color images. FIG. 3 conceptually illustrates such a process for grayscale conversion based on a single control value in some embodiments. FIG. 3 is described in relation to FIG. 2.

Process 300 begins by retrieving (at 310) a color image, such as image 210 of FIG. 2. In some embodiments, the color image can be retrieved from a memory storage (e.g., a non-volatile memory such as a hard disk, flash memory, etc. or a volatile memory such as RAM). The color image of some embodiments can be the result of the application of previous filters, image editing tools and special effects to an earlier version of the image. The retrieved color image is not always displayed visually. For example, in the image editing applications of some embodiments, once the grayscale image converter has been activated, the color image is stored in memory while the current grayscale version of the image is displayed visually. As stages 202-204 of FIG. 2 show, the color image 210 is used to generate the various grayscale images 220-240, but is not itself displayed in those stages 202-204.

Next, the process 300 receives (at 320) a single value for grayscale conversion. In some embodiments, this single value is received from a slider control setting (e.g., from a user setting slider control 225 of FIG. 2). However, in other embodiments, the single value can be received from other types of controls. The process 300 then generates (at 330) a grayscale image based on the original color image and the single value. This is shown in FIG. 2 as each of the images 220, 230, and 240 is generated based on image 210 and a single value (set by the respective slider control settings in stages 202-204). This process 300, with a single value for grayscale conversion, allows the user some control over the conversion without overwhelming the user with too many options.

III. Color Space Parameterization

Figure 4A:
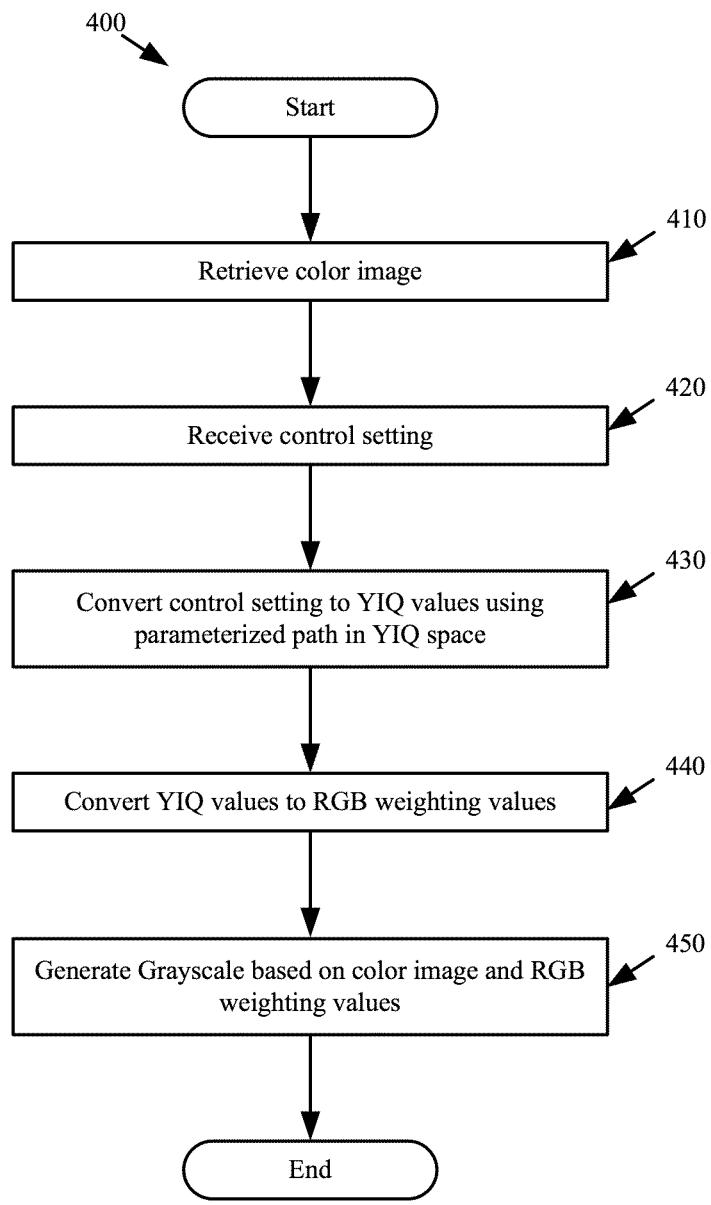
FIG. 4A conceptually illustrates a process of some embodiments for generating a grayscale image based on a single control value.

FIG. 3 illustrates the general process of some embodiments for converting a color image to grayscale based on a single value. FIG. 4A conceptually illustrates a particular, more detailed, process 400 of some embodiments for generating a grayscale image based on a single value. Process 400 will be described in relation to FIGS. 2 and 5-7. The process 400 begins, like the process 300, by retrieving (at 410) a color image (as shown in stage 201 of FIG. 2). The process 400 then receives (at 420) a single value (as shown in stage 202 of FIG. 2).

The process converts (at 430) the control setting to chroma values (e.g., I and Q values) using a parameterized path in a color space (e.g., YIQ color space). More details of using parameterized paths will now be described by reference to FIG. 5, before returning to FIG. 4A. FIG. 5 conceptually illustrates a parameterized path used for converting a single value received from the user into chroma values in YIQ color space. In some embodiments, the path is a closed, circular path. FIG. 5 includes graph 500 with I-axis 510, Q-axis 520, and parameterized path 530.

Graph 500 represents the plane Y=0.5 in the YIQ color space. I-axis 510 represents the set of values in the plane 500 for which the value of Q is zero. Q-axis 520 represents the set of values in the plane 500 for which the value of I is zero. Parameterized path 530 represents a set of points in the plane 500 that correspond to various settings of the slider control 225 (as shown in FIG. 2).

The parameterized path 530 in YIQ color space can be represented by equation (3), below:

$$(Y,I,Q)(\text{slider})=(0.5, 0.7*\sin(\text{slider}*2\pi), 0.7*\cos(\text{slider}*2\pi)) \quad (3)$$

In the above equation (3), (Y, I, Q) is a vector in YIQ color space pointing to a location on the parameterized path 530 and "slider" represents the single value provided by the slider control. The specific location on the path is determined by the slider control value (not shown). In some embodiments, the slider control value ranges from 0 to 1. In the parameterized path 530, a slider control value of 0 corresponds to an I value of 0 and a Q value of 0.7, while a slider control value of 0.5 (halfway between the extremes) corresponds to an I value of 0 and a Q value of −0.7. One of ordinary skill in the art will understand that in the parameterized path represented by equation (3), at each endpoint of the path (when the slider control value is 0 or 1), the I and Q components are identical, at the top of the path (Q=0.7, I=0). Therefore, for embodiments using equation (3), the extreme ends of the slider control produce results that are identical to each other. Equation (3) traces out a circle in YIQ color space with a radius of 0.7. The Y value for each point on the parameterized path of equation (3) is 0.5. In some embodiments other radii are used instead of 0.7, and/or other Y values are used instead of 0.5. Furthermore, in some embodiments one or more controls are provided to adjust the radius, the Y value, or both.

After the process 400 generates the Y, I, and Q values, the process 400 then converts (at 440) the color space (e.g., YIQ color space) values to RGB weighting values (i.e., $w_r$, $w_g$, and $w_b$). In some embodiments, the conversion from YIQ color space values to RGB weighting values is performed using a transformation from YIQ color space to RGB color space, such as with the equations (4A), (4B), and (4C).

$$w_r = Y + 0.956296*I + 0.621024*Q \quad (4A)$$

$$w_g = Y - 0.272122*I - 0.647381*Q \quad (4B)$$

$$w_b = Y - 1.10699*I - +1.70461*Q \quad (4C)$$

In the above equations (4A)-(4C), Y=0.5 (in accord with the Y-coordinate of the parameterized path) and the values of I and Q are set by applying the slider control value to equation (3), above. One of ordinary skill in the art will understand that in some embodiments, different transformation matrixes from YIQ color space are used. Furthermore, in some embodiments entirely different color spaces are used for the parameterized path such as HSV, YUV, YPbPr and/or YCbCr color spaces, or any other color spaces. The image editing applications of such embodiments may employ appropriate formulae to transform values from the color spaces they use to RGB weighting values.

Figure 6:
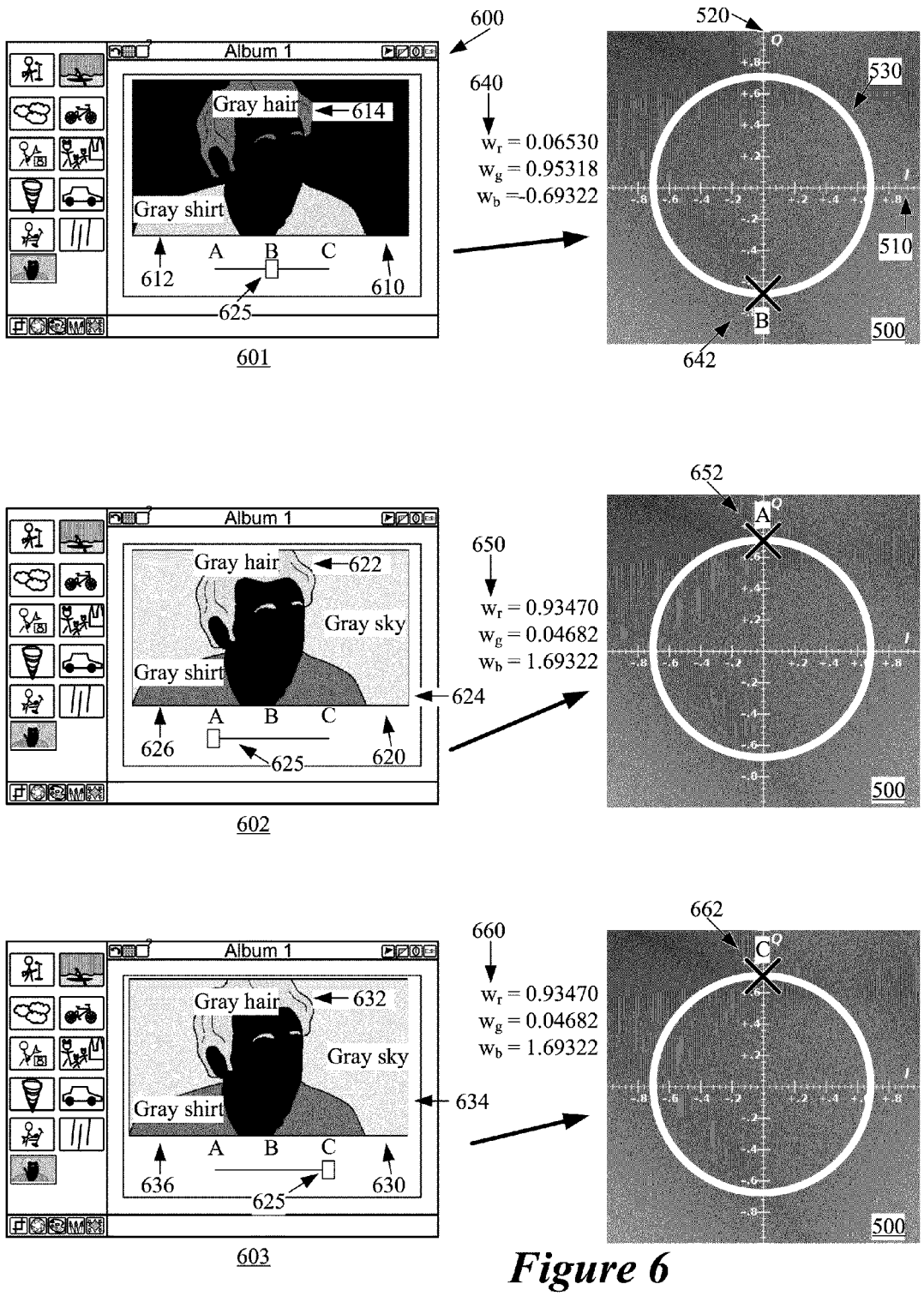
FIG. 6 illustrates an image editing application performing grayscale conversions using a circular parameterized path.

The process 400 then generates (at 450) a grayscale image based on the weighting values. FIG. 6 illustrates an image editing application performing grayscale conversions using the circular parameterized path of FIG. 5. Some sets of weighting values ($w_r$, $w_g$, and $w_b$) generated in operation 440 are illustrated in FIG. 6 along with grayscale conversions based on each set of weighting values. The weighting values for each grayscale image are set according to a position on the parameterized path. Each position is determined by a slider control 625. FIG. 6 includes an image editing application 600 at stages 601, 602, and 603, grayscale images 610, 620, and 630, slider control 625, sets of weighting values 640, 650, and 660, and selected points 642, 652, and 662. Image 610 includes gray shirt 612 and gray hair 614. Image 620 includes gray hair 622, gray sky 624, and gray shirt 626. Image 630 includes gray hair 632, gray sky 634, and gray shirt 636.

Stage 601 shows the image editing application of some embodiments in a default state of the grayscale conversion, with the slider control 625 at point B, halfway between the extreme points (A and C). Stages 602 and 603 show the application of some embodiments in which the slider control 625 has been moved to extreme points A and C respectively. Each set of weighting values 640, 650, and 660 determines how a color image 210 (shown in FIG. 2) will be converted to a grayscale image (grayscale images 610, 620, and 630, respectively). Selected points 642, 652, and 662 represent the points on the plane 500 (as shown in FIG. 6) corresponding to the location of slider control 625 (i.e., B, A, and C) in stages 601-603. Gray shirt 612 and gray hair 614 show how green and red pixels, respectively, are transformed by the weighting values 640. Gray hair 622, gray sky 624, and gray shirt 626 show how red, blue, and green pixels, respectively, are transformed by the weighting values 650. Gray hair 632, gray sky 634, and gray shirt 636 show how red and blue pixels are affected by the weighting values 660.

In stage 601, the green weighting value is almost 1, the red weighting value is very small (about 0.065) and the blue weighting value is negative. Because the green weighting value is so large (almost 1) any green pixels in the original image 210 will result in relatively bright corresponding pixels in the grayscale image 610. This is shown in equations (2), repeated below, and (5A)-(5C), also below:

$$\text{luminance} = (w_r, w_g, w_b) \cdot (r, g, b) = w_r r + w_g g + w_b b \quad (2)$$

Where equation 2 is the previously provided general equation for calculating grayscale luminance based on weighting values. When the weighting values $w_r$, $w_g$, and $w_b$ have the specific values show in weighting values 640 in FIG. 6, the equation becomes:

$$\text{luminance} = 0.065 * r + 0.953 * g - 0.693 * b \quad (5A)$$

In the case of the shirt in original color image 210, all the pixels are green with no red or blue component. That is, the red and blue component values of the pixels that make up the shirt are both zero, while the green component values are various large values (different values for different pixels of the shirt) which are therefore still represented by the variable "g". Therefore the equation becomes:

$$\text{luminance} = 0.065 * 0 + 0.953 * g - 0.693 * 0 \quad (5B)$$

When the zero values are factored into the equation, the equation for the pixels of the shirt reduces to:

$$\text{luminance} = 0.953 * g \quad (5C)$$

The multiplier of 0.953 is high, and for the shirt the values of g are high. Accordingly, the shirt is bright gray in grayscale image 610. In contrast, the relatively low red weighting value (about 0.065) is applied to the red hair in image 210. The low red weighting value results in the red hair in the color image 210 being converted to dim gray hair 614 in the grayscale image 610. As the blue weighting value is a negative number, the calculated luminance of the grayscale image pixels corresponding to the blue pixels of the sky in image 210 will be negative as shown in equation (6), below:

$$\text{luminance} = w_b * b < 0 \text{ if } w_b < 0 \quad (6)$$

In the above equation (6), $w_b$ is the weighting factor for blue components of pixels and b is the blue component of the pixel (b ranges from 0 to 1). As previously mentioned, a calculated luminance less than zero results in a black pixel (because the luminance is set equal to 0) in the grayscale image. Therefore the blue sky in the color image 210 has been converted to black in image 610.

The original image 210 has pixels that are either all blue, all green, or all red with no mixed colors. However in an image with pixels of mixed colors (e.g., any pixel that has more than one positive component), the weighting values $w_r$, $w_g$, and $w_b$ are applied separately to each component (r, g, and b) before the values are added to each other, to perform equation (2).

In the set of weighting values 640, $w_g$ is positive. Accordingly (if both other component values are constant), the larger the green component value of a pixel is, the brighter (higher luminance) the corresponding pixel in the grayscale image will be. In the set of weighting values 640, $w_b$ is negative. Therefore (if both other component values are constant), the larger the blue component of a pixel is, the dimmer (lower luminance) the corresponding pixel in the grayscale image will be. That is, a pixel with a low green value (g) and a large blue value (b) will be converted to a dark (or black) pixel in the grayscale image. The pixel is black because the negative blue weighting combined with the large blue value overwhelms the positive green weighting combined with the low green value. In contrast, a pixel with a large green value (g) and a small blue value (b) will result in a bright pixel in the grayscale image. The pixel is bright because the negative blue weighting combined with the small blue value is overwhelmed by the positive green weighting combined with the high green value. Because the red weighting value $w_r$ is small in weighting values 640, the red component of a pixel would have a small effect on the brightness and/or darkness of the corresponding grayscale pixel.

The slider control 625 in stage 602 is set to point A (a 0 value for the slider control of these embodiments). As a result of this setting, in the parameterized path 530, the red weighting value ($w_r$) of weighting values 650, is almost 1. Therefore, bright red pixels in the original image 210 correspond to bright pixels in the grayscale image 620.

In this stage 602, the blue weighting value is greater than 1. Therefore the product of the blue weighting value ($w_b$) and the blue component of a blue pixel in the color image 210 is much greater than the component value in the original color image (210). Accordingly the blue pixels in the original image 210 correspond to pixels in the grayscale image 620 that are very bright (e.g., brighter than the original blue pixels). Similar to the red weighting value in stage 601, the green weighting value in stage 602 is very small. Therefore, the product of the green weighing value ($w_g$) and the green component values (g) will be small. Accordingly, the green shirt from original image 210 is converted to a very dim gray shirt 626 in stage 602.

Stages 602 and 603 demonstrate that the endpoints of the slider control settings generate identical grayscale images. In stage 603, the slider control is at C (value 1), while in stage 602 the slider control is at A (value 0). Even though the slider controls are at completely opposite positions in stages 602 and 603, the selected points 652 and 662 are at the same location in the YIQ color space. The matching of the locations of the selected points 652 and 662 occurs because the path is circular, so the start and end of the path is the same. That is, in the equation (3) (which is repeated below), a slider control value of 0 creates the same results as a slider control value of 1.

$$(Y, I, Q)(\text{slider}) = 0.5, 0.7 * \sin(\text{slider} * 2\pi), 0.7 * \cos(\text{slider} * 2\pi)) \quad (3)$$

In the above equation, "slider" represents the value set by the slider control and (Y,I,Q) is a vector in YIQ color space. The identical points in YIQ space result in sets of weighting values 650 and 660 which are identical to each other. The identical weighting values and identical original image 210 lead to identical grayscale images 620 and 630.

IV. Normalization

One significant difference between stage 601 and stages 602 and 603 is that the image 610 is significantly darker than images 620 and 630. Image 610 is darker because the sum of the weighting values 640 (used to generate image 610) is much lower than the sum of the weighting values 650 or 660 (used to generate images 620 and 630). Specifically, the weighting values used to generate image 610 sum to about 0.33. Each set of weighting values used to generate images 620 and 630 sums to about 2.67, a number over 8 times greater than the sum of the weighting values used to generate image 610.

Figure 4B:
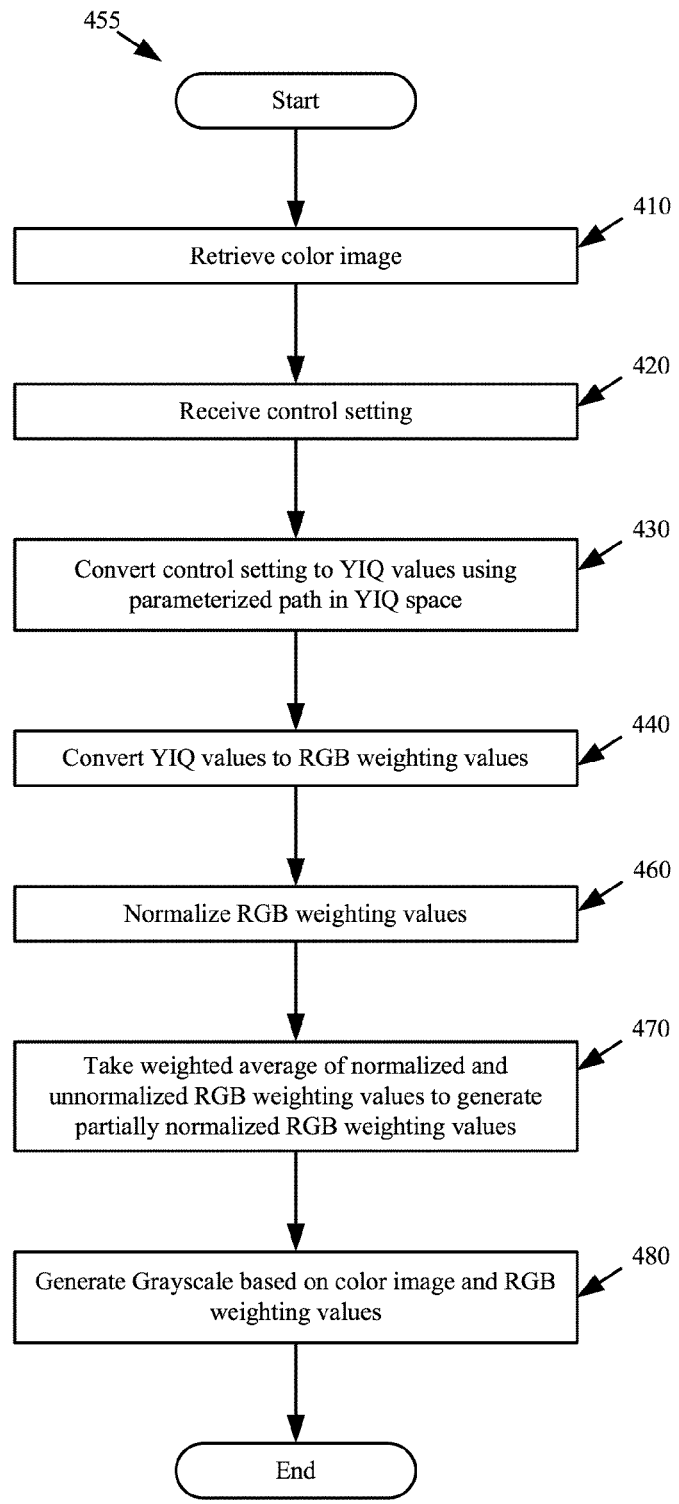
FIG. 4B conceptually illustrates a process of some embodiments for generating a grayscale image based on a single control value with normalization operations.

The image editing applications of some embodiments perform normalization operations to reduce the disparity in brightness between different conversions at different slider control settings. The image editing application illustrated in FIG. 6 does not perform such operations. As a result, the level of brightness of each grayscale image is very different at different slider control 625 settings. In order to reduce such disparity in the difference of brightness levels, the image editing applications of some embodiments use additional operations, such as the normalizing operations shown in FIG. 4B. FIG. 4B conceptually illustrates a process 455 of some embodiments for generating a grayscale image based on a single control value with normalization operations. The process 455 illustrated in FIG. 4B performs the same operations 410-440 as the process 400 illustrated in FIG. 4A. However, after generating a set of weighting values in operation 440, process 455 normalizes (at 460) the weighting values. Some embodiments use equations (7A)-(7C) to generate the normalized weighting values.

$$w_{rn}=w_r/(w_r+w_g+w_b) \quad (7A)$$

$$w_{gn}=w_g/(w_r+w_g+w_b) \quad (7B)$$

$$w_{bn}=w_b/(w_r+w_g+w_b) \quad (7C)$$

In the above equations (7A)-(7C), $w_{rn}$ is the normalized red weighting value, $w_{gn}$ is the normalized green weighting value, and $w_{bn}$ is the normalized blue weighting value. Equations (7A)-(7C) ensure that the normalized weighting values sum to 1, regardless of the initial values. This reduces the disparity in average brightness in the grayscale images at different settings.

One of ordinary skill in the art will realize that other formulae can be used to reduce the disparity of brightness levels. For example, in some embodiments, the image editing application performs alternate calculations to normalize the weighting values. In the image editing applications of some such embodiments, these weighting values are divided by the length of a weighting vector with values $w_r$, $w_g$, and $w_b$.

$$w_{rn}=w_r/(w_r{}^2+w_g{}^2+w_b{}^2)^{0.5} \quad (8A)$$

$$w_{gn}=w_g/(w_r{}^2+w_g{}^2+w_b{}^2)^{0.5} \quad (8B)$$

$$w_{bn}=w_b/(w_r{}^2+w_g{}^2+w_b{}^2)^{0.5} \quad (8C)$$

In the above equations (8A)-(8C) $w_{rn}$ is the normalized red weighting value, $w_{gn}$ is the normalized green weighting value, and $w_{bn}$ is the normalized blue weighting value. Dividing by the length of the weighting vector generates a normalized weighting vector ($w_{rn}$, $w_{gn}$, $w_{bn}$) with a length of 1, rather than a normalized weighting vector the components of which sum to 1 (as is generated by equations (7A)-(7C)).

Normalized weighting values may reduce the visual impact of different settings. Therefore, to allow for some disparity in the average brightness at different settings, the image editing applications of some embodiments generate (at 470) a weighted average of the normalized and unnormalized weighting values. This weighted average is referred to herein as "partially normalized" weighting values. Some embodiments use equations (9A)-(9C) to generate partially normalized weighting values.

$$w_{rpn}=k*w_{rn}+(1-k)*w_r \quad (9A)$$

$$w_{gpn}=k*w_{gn}+(1-k)*w_g \quad (9B)$$

$$w_{bpn}=k*w_{bn}+(1-k)*w_b \quad (9C)$$

In the above equations (9A)-(9C), $w_{rn}$ is the normalized red weighting value, $w_{gn}$ is the normalized green weighting value, $w_{bn}$ is the normalized blue weighting value, $w_{rpn}$ is the partially normalized red weighting value, $w_{gpn}$ is the partially normalized green weighting value, $w_{bpn}$ is the partially normalized blue weighting value, and k is a constant. In some embodiments k is between 0.6 and 0.7 (e.g., k is ⅔ in some embodiments). Embodiments that generate partially normalized weighting values then generate (at 480) a grayscale image based on the original color image (e.g., image 210) and the partially normalized weighting values.

Partially normalized weighting values generated in operation 470 are in some ways superior to fully normalized weighting values generated in operation 460. For example, partially normalized weighting values allow some variation in brightness levels of grayscale images generated at different settings without allowing excessive variation. However, one of ordinary skill in the art will understand that some image editing applications that are still within the scope of the invention do not perform operation 470 and instead proceed to generate (at 480) the grayscale image based on the normalized weighting values generated in operation 460.

Figure 7:
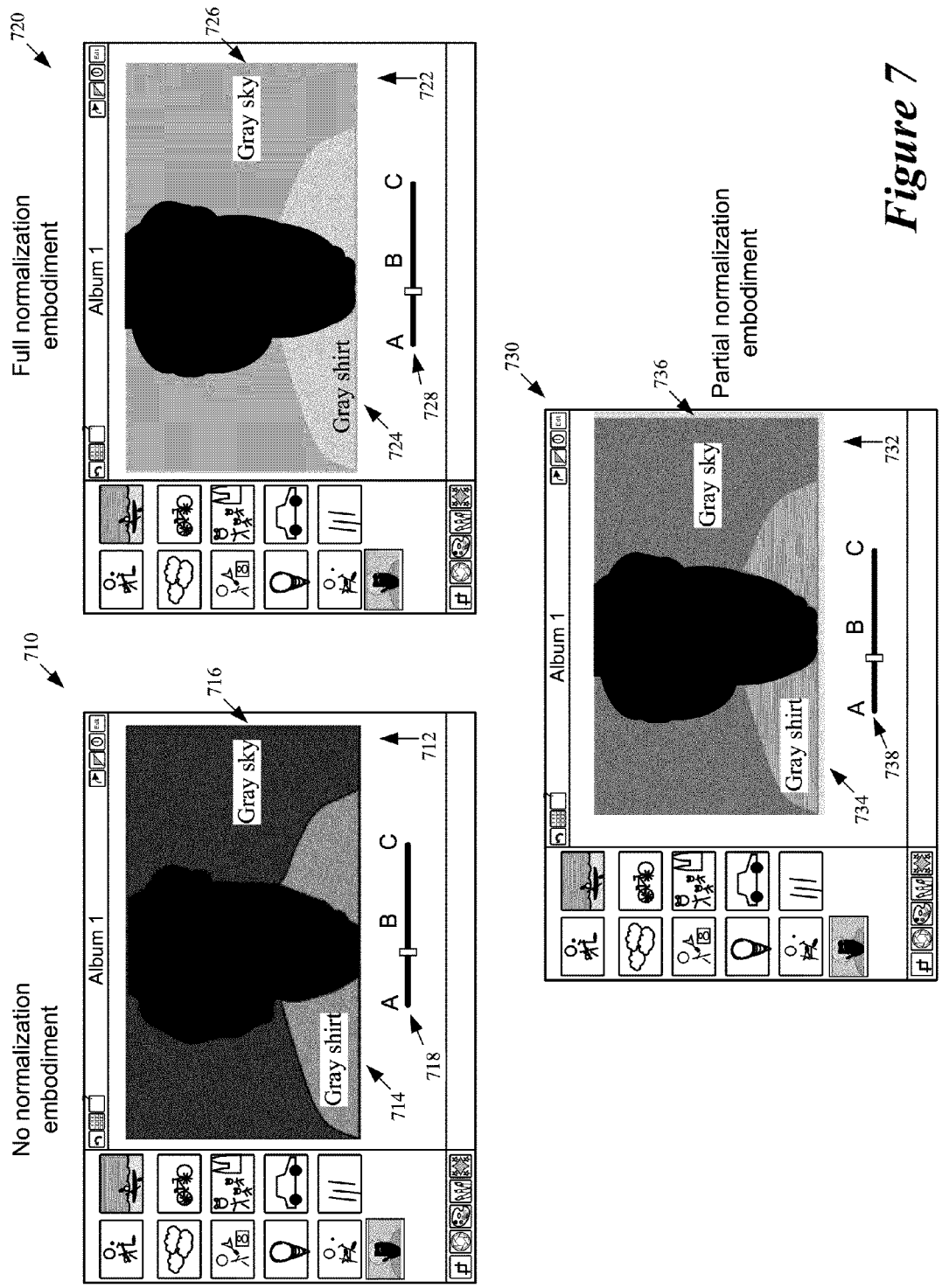
FIG. 7 illustrates grayscale conversions of multiple embodiments with multiple normalization levels.

FIG. 7 illustrates grayscale conversions performed by multiple image editing applications of different embodiments with different normalization levels. Each grayscale conversion uses the same slider control settings and parameterized path, but different levels of normalization. FIG. 7 includes applications 710, 720, and 730, grayscale images 712, 722, 732, and slider controls 718, 728, 738. Grayscale image 712 includes gray shirt 714 and gray sky 716. Grayscale image 722 includes gray shirt 724 and gray sky 726. Grayscale image 732 includes gray shirt 734 and gray sky 736. Applications 710, 720, and 730 are applications of separate embodiments that differ by the extent to which they apply normalization to grayscale weighting values. Grayscale images 712, 722, and 732 show the effects of the different levels of normalization on grayscale images. The slider controls 718, 728, and 738 show the settings of the different applications for which the value of the grayscale conversion setting is the same. The gray shirts 714, 724, and 734 show the effects of the normalization on the green pixels of an original image 210 (not shown). Similarly, the gray skies 716, 726, and 736 show the effects of normalization on the blue pixels of the original image 210.

For the non-normalized grayscale image of FIG. 7, the sum of the weighting values is a positive value less than 1. Thus the normalization of the weighting values divides the weighting values by a number less than 1. Dividing the weighting values by a number less than 1 results in an increase in the weighting values during the normalization process. The image 712 is generated with unnormalized weighting values and the image 722 is generated with the normalized weighting values.

Accordingly, as FIG. 7 shows, full normalization of weighting values results in the image 722 being lighter than the image 712 generated without normalizing the weighting values. This can be seen by comparing the brightness of either the gray shirts 714 and 724 or the brightness of the gray skies 716 and 726. The increase of the weighting values caused by the normalization increases the brightness of both the gray shirt 724 and the gray sky 726.

The image 732 is generated with partially normalized weighting values. Because the weighting values used to generate the image are a weighted average of the normalized and unnormalized weighting values, the image 732 is of an intermediate brightness between the brightness of the two images 712 and 722. This can be seen by comparing the brightness of the gray shirts 714, 724, and 734 or the brightness of the gray skies 716, 726, and 736. The increase of the weighting values caused by the normalization increases the brightness of both the gray shirt 734 and the gray sky 736 above the brightness of the gray shirt 714 and the gray sky 716. However for partial normalization the increase in brightness of the gray shirt 734 and the gray sky 736 is less than the increase in brightness for the gray shirt 724 and the gray sky 726.

The slider controls 718, 728, and 738 are all set to the same slider control value and the same parameterization path (not shown) is used for the applications 710, 720, and 730 of the three different embodiments. Accordingly, the differences in the brightness of the images are entirely due to the different normalization level of each image.

V. Alternate Parameterized Paths

As described above, the image editing applications of some embodiments use equation (3) to generate YIQ color space values from slider control values. However, other embodiments use other equations to generate their YIQ color space values. For example, some embodiments use a parameterized path similar to the parameterized path defined by equation (3), but with a different starting/ending point. Such a parameterized path is generated by equation (10), below:

$$(Y,I,Q)(\text{slider}) = (0.5, 0.7*\sin(\text{slider}*2\pi - \pi/2), 0.7*\cos(\text{slider}*2\pi - \pi/2)) \quad (10)$$

As was the case with equation (3), in equation (10), (Y, I, Q) is a vector in YIQ color space, and "slider" represents the value set by the slider control. Equation (10) yields different YIQ values for the same slider settings as equation (3).

FIG. 8 illustrates an image editing application performing grayscale conversions using the circular parameterized path defined by equation (10). The parameterized values for this path are offset compared to that of FIG. 6 and the weighting values are partially normalized. FIG. 8 includes application 800 at stages 801, 802, and 803, grayscale images 810, 820, and 830, slider control 825, weighting values 840, 850, and 860, selected points 842, 852, and 862, and parameterized path 870. Image 810 includes gray hair 812 and gray shirt 814. Image 820 includes gray shirt 822 and gray sky 824. Image 830 includes gray shirt 832 and gray sky 834.

Stage 801 shows the application of this embodiment in the default state of grayscale conversion. The parameterized path 870, along with the slider control 825 position is used to determine the selected point 842. Selected point 842 identifies the location in the I-Q plane corresponding to slider control position B. The weighting values 840 determine the effects of various color components of original image 210 (of FIG. 2) on the grayscale image 810. Grayscale image 810 is a converted version of image 210. Gray hair 812 corresponds to the red hair in image 210. Similarly, gray shirt 814 corresponds to the green shirt in image 210.

Stages 802 and 803 show the state of the application when the slider control 825 is set to extreme points A and C, respectively. Selected points 852 and 862 identify the location in the I-Q plane corresponding to slider control positions A and C. The weighting values 850 and 860 determine the effects of various color components of original image 210 (not shown) on the grayscale images 820 and 830. Grayscale images 820 and 830 are converted versions of image 210. Gray skies 824 and 834 correspond to the blue sky in image 210. Similarly, gray shirts 822 and 832 correspond to the green shirt in image 210.

The application 800 uses partially normalized weighting values such as those generated by equations (9A)-(9C) with a k value of ⅔. The partially normalized weighting values 850, and 860 both include low values for $w_{gpn}$, high values for $w_{bpn}$ and negative values for $w_{rpn}$. Accordingly, red pixels in the original image 210 correspond to black pixels in the images 820 and 830, while the blue pixels from the original image 210 correspond to relatively bright pixels in the images 820 and 830 and the green pixels from the original image 210 correspond to relatively dim pixels in the images 820 and 830.

In the illustrated embodiment, the default setting for the slider control is shown in stage 801. The slider control value (0.5) is the same in this stage as the slider control value in stage 601 of FIG. 6. However, because the embodiments of these figures use different parameterized paths, selected point 842 of this embodiment is different from selected point 642 of the embodiment illustrated in FIG. 6. One advantage of the parameterized path 870 over parameterized path 530 is that the default slider control value (0.5, i.e., point B) for parameterized path 870 generates a large red weighting value, which tends to improve representations of skin tones (e.g., faces) in real photographic images. This is not shown in the stylized images herein, because the face in the color image 210 of FIG. 2 has color values of (0, 0, 0) (e.g., zero red, blue, and green values). Therefore, the faces in the grayscale image have a luminance of 0.

FIGS. 5, 6, and 8 illustrate embodiments that use circular parameterized paths. However, one of ordinary skill in the art will understand that non-circular parameterized paths are also possible within the scope of some embodiments. In fact, some embodiments can use any arbitrarily defined parameterized paths through the colorspace. FIG. 9 illustrates an image editing application performing grayscale conversions using an arbitrary parameterized path through the I-Q plane with Y equal to 0.5. The path in this figure is still in the same plane as the circular paths of the previous figures. However, in other embodiments, the path may be in a plane with a different Y value, or even path through multiple Y values. The arbitrary path of this figure is open, so the endpoints are not congruent with each other. FIG. 9 includes application 900 at stages 901, 902, and 903, grayscale images 910, 920, and 930, slider control 925, sets of weighting values 940, 950, and 960, selected points 942, 952, and 962, and parameterized path 970 on plane 500. Grayscale image 910 includes gray hair 912 and gray sky 914. Grayscale image 920 includes gray hair 922 and gray shirt 924. Grayscale image 930 includes gray sky 932 and gray shirt 934.

Stages 901, 902, and 903 show the application with various settings of slider control 925. Grayscale images 910, 920, and 930 represent different grayscale conversions of image 210 (of FIG. 2). Parameterized path 970 represents a different parameterization than those shown in FIGS. 5-8. Specifically, parameterized path 970 is an open path with separated end points. Selected points 942, 952, and 962 show the locations in the I-Q plane that correspond to the respective slider control values in stages 901-903. The sets of weighting values

940, 950, and 960 determine the effects of various color components of original image 210 on the grayscale images 910, 920 and 930. Gray hair 912 and gray sky 914 are the grayscale equivalents in image 910 of the red hair and blue sky in image 210. Gray hair 922 and gray shirt 924 are the grayscale equivalents in image 920 of the red hair and green shirt in image 210. Gray sky 932 and gray shirt 934 are the grayscale equivalents of the blue sky and green shirt in image 210.

Image editing application 900 differs from image editing application 800 of FIG. 8 in that the parameterized paths are different for the different applications. However, both applications 900 and 800 perform the same partial normalization on their respective weighting values once they are generated.

Stage 901 shows the image editing application 900 with slider control 925 at setting A (with a value of zero), which generates image 910. The selected point 942 of the parameterized path 970 is at the beginning of the parameterized path 970. The grayscale image 910 is based on a conversion of image 210 of FIG. 2. This setting of the slider control leads to a set of weighting values 940 with a high value for blue weighting, medium value for red weighting, and negative value for green weighting. Accordingly, grayscale image 910 has a light gray sky 914, medium gray hair 912, and the pixels corresponding to the shirt in image 210 are black.

Stage 902 shows the image editing application 900 with slider control 925 at setting B (with a value of 0.5), which generates image 920. The selected point 952 of the parameterized path 970 is at a middle point of the parameterized path 970. The grayscale image 920 is also based on a conversion of image 210. This setting of the slider control leads to a set of weighting values 950 with a high value for red weighting, medium value for green weighting, and negative value for blue weighting. Accordingly, grayscale image 920 has light gray hair 922 and medium green shirt 924, and the pixels corresponding to the sky in image 210 are black.

Stage 903 shows the image editing application 900 with slider control 925 at setting C (with a value of 1), which generates image 930. In the previous figures, with their circular parameterized paths 530 (of FIG. 5) and 870 (of FIG. 8), the set of weighting values was the same for point A as for point C. However parameterized path 970 is not circular. Therefore, the selected point 962 of the parameterized path 970 is at an opposite end point of the parameterized path 970 from previously selected point 942. The grayscale image 930 is also based on a conversion of image 210. This setting of the slider control leads to a set of weighting values 960 with a medium-high value for blue weighting, medium value for green weighting, and negative value for red weighting. Accordingly, grayscale image 930 has gray sky 932 and medium green shirt 934, and the pixels corresponding to the hair in image 210 are black.

As mentioned above, the path 970 is not a closed path and the end points (selected points 942 and 962) are not identical to each other as was the case with parameterized paths 530 and 870. Therefore the sets of weighting values 940 and 960 are not the same as each other as was the case with the sets of weighting values corresponding to the endpoints of slider controls 625 (i.e., sets of weighting values 650 and 660) and 825 (i.e., sets of weighting values 850 and 860). Furthermore, because the image editing application of this embodiment uses a different parameterized path from paths 530 (of FIG. 5) and 870 (of FIG. 8), the weighting values generated by the image editing application 900 for the same slider control settings (A, B, and C) are different from the weighting values generated by the other image editing applications (illustrated in FIGS. 6 and 8) with the same slider control settings.

Although the parameterized path of FIG. 9 is not circular, it is approximately circular. Some embodiments use parameterized paths that even more closely approximate a circle (e.g., a spiral path with endpoints that are close to each other but not congruent). However, some embodiments use parameterized paths that are not approximately circular. Furthermore, some embodiments use parameterized paths that are not limited to a single plane in a color space.

VI. Conversion of Multi-component Pixels

Figure 10:
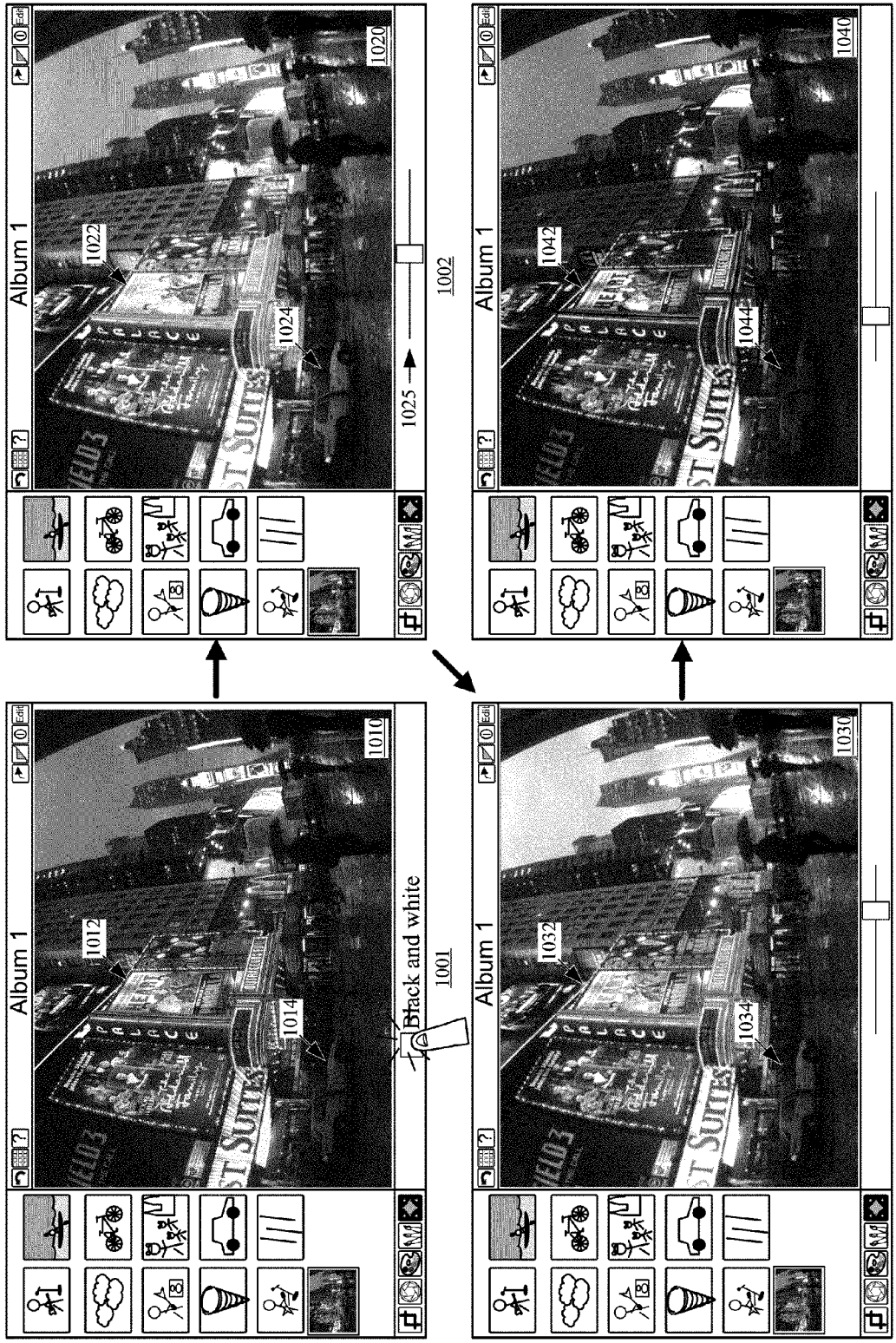
FIG. 10 illustrates actual grayscale conversions in one embodiment.

For ease of description, the preceding figures illustrated grayscale conversions based on converting pixels of image 210 (of FIG. 2). Each of the pixels in image 210 was all red, all blue, or all green. However, grayscale conversion by the illustrated embodiments also works on images that have pixels with multiple color components (which is the case with a typical photograph). FIG. 10 illustrates grayscale conversions by an image editing applications of an embodiment. The images include a color image and three images converted to grayscale based on three different settings of a single grayscale conversion control. FIG. 10 includes images 1010, 1020, 1030, and 1040 in stages 1001-1004 and slider control 1025. Image 1010 includes poster 1012 and car 1014. Image 1020 includes poster 1022 and car 1024. Image 1030 includes poster 1032 and car 1034. Image 1040 includes poster 1042 and car 1044. The posters 1012, 1022, 1032, and 1042 all correspond to each other in their respective images. The cars 1014, 1024, 1034, and 1044 all correspond to each other in their respective images.

In the first stage 1001, image 1010 is a color image with multiple elements. Included in those elements are a poster 1012 and a car 1014. The poster 1012 includes, in red letters on a white background, the word "heart" in capital letters. The car 1014 is red against a shadowed (almost black) background. The following stages 1002-1004 show different grayscale versions of the image 1010 corresponding to different settings of slider control 1025. In each of the stages 1002-1004, some of the elements visible in the image 1010 are emphasized in the converted grayscale images 1020-1040. Similarly, some of the elements visible in the image 1010 are deemphasized in the converted grayscale images 1020-1040.

In stage 1002, the slider control 1025 is set to a value of 0.5. The image editing application of the embodiment illustrated in FIG. 10 uses the parameterized path of equation (10). The slider control value of 0.5 generates a partially normalized red weighting value ($w_{rpn}$) that is large and positive, a partially normalized green weighting value ($w_{gpn}$) that is small and positive and a partially normalized blue weighting value ($w_{bpn}$) that is small and negative. The partially normalized weighting values will be referred to as "weighting values" for the sake of brevity.

Turning back briefly to stage 1001, in color image 1010, the white pixels in the background of the poster 1012 contain a high amount of each component (for example the brightest possible white pixel has a value of 1 for each component). Because of the positive red and green weighting values ($w_{rpn}$ and $w_{gpn}$) in stage 1002, the large red and green components of the white pixels tend to make the corresponding pixels bright in grayscale image 1020. Because of the negative blue weighting value in stage 1002, the large blue component of the white pixels tends to make the corresponding pixels in grayscale pixel dimmer. However, the blue weighting value ($w_{bpn}$) is a small negative number in stage 1002. In contrast, the red weighting value ($w_{rpn}$) is a large positive number in stage 1002. Accordingly, the large red component of each white pixel of image 1010, makes the corresponding pixel in grayscale image 1020 bright, while the blue component of the white pixels only slightly lowers that brightness of the corresponding grayscale pixel. Therefore the white pixels in the original image have bright corresponding pixels in the grayscale image.

Similarly, the high positive red weighting value ($w_{rpn}$) of stage 1002 applies to the red pixels of the word "heart" in the original image. Therefore the corresponding pixels in grayscale image 1020 are bright. As the figure shows in stage 1002, the red lettering is brightened to about the same luminance as the white background. In grayscale image 1020, the lettering (now white) cannot be easily read against the white background. Therefore, in poster 1022, the word "heart" has almost disappeared.

In contrast, the car 1014 in color image 1010 is red against a dark background. The dark background of car 1014 leads to a similarly dark background for corresponding car 1024 in stage 1002. As previously described, the red weighting value in stage 1002 is positive and large. Accordingly, in stage 1002, the pixels of car 1024 are bright because they correspond to the pixels of red car 1014 from stage 1001.

The slider control 1025 value in stage 1003 is set to about 0.75. When this setting is applied by the image editing application to the equations described with respect to stage 1002, the red weighting value ($w_{rpn}$) is set to a medium level. In stage 1003, the converted white pixels outshine the converted red pixels. Therefore it is easier to read the word "heart" on the poster 1032. Similarly, the car 1034 has dimmed slightly against the background as compared to stage 1002.

Finally, in stage 1004, the slider control 1025 is set at about 0.25. In this stage, the red weighting value is very low, so the red letters of the word "heart" in poster 1042 show up as dark pixels against a light background. Because the letters of the word "heart" are dark against a light background, the word is very easy to see in this stage 1004. This shows that when a colored item is against a light background in an original color image, the contrast between the color and the background can be enhanced by setting a low weighting value for the color component (or components) that is highest for the item. The car 1044 is similarly dimmed compared to the cars 1024 and 1034 in stages 1002 and 1003. Because the car 1044 is a dim car against a dim background it is difficult to see in this stage 1004. This shows that when a colored item is against a dark background in an original color image, the contrast between the color and the background can be enhanced by setting a high weighting value for the color component (or components) that is highest for the item. Depending on whether the user wanted to emphasize the car or the wording on the poster, the user would use different settings of slider control 1025. The ability to emphasize different features of an image at different slider control settings is one advantage of some embodiments.

VII. Software Architecture

Figure 11:
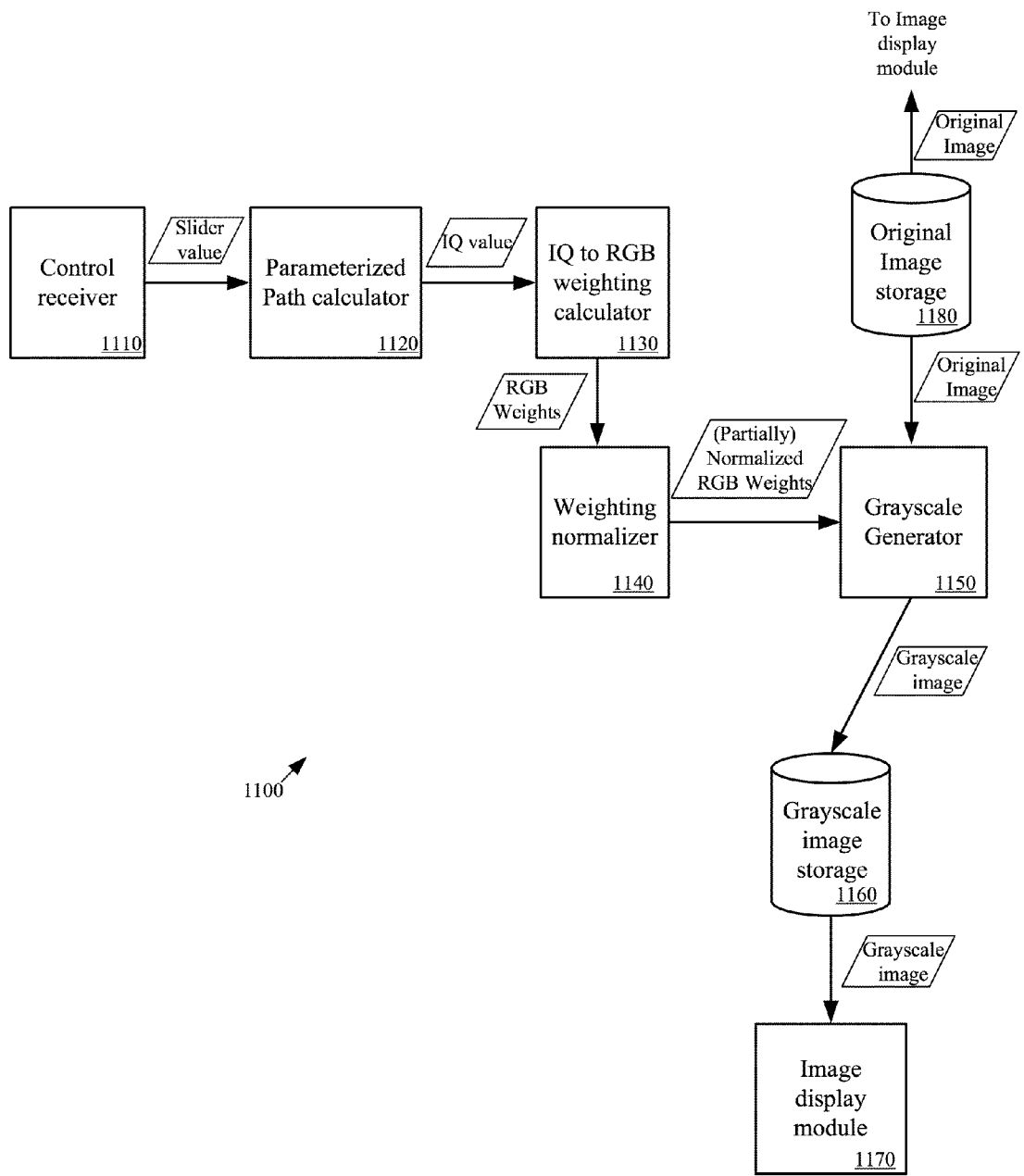
FIG. 11 conceptually illustrates a software architecture of an image editing application of some embodiments.

In some embodiments, the processes described above are implemented as software running on a particular machine, such as a computer or a handheld device, or stored in a machine-readable medium. FIG. 11 conceptually illustrates part of the software architecture of an image editing application 1100 of some embodiments. In some embodiments, the image editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The architecture is simplified to represent the portion of the image editing application that performs the color image to grayscale image conversion in some embodiments. FIG. 11 includes software architecture diagram 1100, control receiver 1110, parameterized path calculator 1120, weighting calculator 1130, weighting normalizer 1140, grayscale generator 1150, grayscale image storage 1160, image display module 1170, and original image storage 1180.

The control receiver 1110 receives slider control values. The parameterized path calculator 1120 converts slider control values to values in the YIQ color space. The RGB weighting calculator 1130 converts YIQ values to RGB weights. The weighting normalizer 1140 normalizes RGB weighting values. In some embodiments the weighting normalizer 1140 fully normalizes the RGB weighting values, while in other embodiments the weighting normalizer 1140 partially normalizes the RGB weighting values. Image editing applications of some embodiments do not include a weighting normalizer module, as described in detail in section IV, above. The grayscale generator 1150 takes color images and converts them to grayscale images according to a given set of RGB weighting values. The grayscale image storage 1160 stores grayscale images. The image display module 1170 displays images to a user. The original image storage 1180 stores a color image.

In operation, the original image storage 1180 contains an original color image. The image editing application of some embodiments retrieves the image or tags the image as soon as the grayscale converter is activated. When the grayscale converter is activated, the control receiver 1110 receives a slider control setting either from a user or from an internal default value. In the grayscale conversion tool of some embodiments, only one value at a time can be set. For ease of description, the value is described herein as a slider control value. However, in the image editing applications of some embodiments the control receiver receives other types of settings, either instead of or in addition to slider control settings. For example, in some embodiments the control receiver receives a numerical value typed in on a keyboard, or a setting on a dial or a wheel control tool.

In the image editing applications of some embodiments, any time a new value is received (e.g., from a slider control), the control receiver passes the value on to the parameterized path calculator 1120. The parameterized path calculator then applies the received single value to the parameterized path equation (e.g., equation (3) or equation (10)). The parameterized path equation produces a set of values in YIQ color space in some embodiments. One of ordinary skill in the art will understand that the scope of the invention is not limited to conversions into YIQ color space, but that in other embodiments, the parameterized path produces values in YUV color space, HSV color space, RGB color space, or any other color space. In some embodiments in which the parameterized path is in a non-RGB color space the values calculated from the parameterized path are then converted into weighting values in RGB color space by an RGB weighting calculator 1130. One of ordinary skill in the art will understand that embodiments in which the parameterized path is already in RGB color space do not require the parameterized path calculator 1120 and RGB weighting calculator 1130 as separate modules, because the parameterized path in applications of such embodiments already produces RGB values.

As previously described, some embodiments normalize the weighting values, while other embodiments do not. Some embodiments that normalize the weighting values use a weighting normalizer 1140 to convert the original RGB values to normalized or partially normalized values. The RGB weighting values (whether normalized or not) are passed to the grayscale generator 1150. The grayscale generator 1150 converts the tagged/retrieved color image from original image storage 1180 to a grayscale image on a pixel by pixel basis (e.g., by applying equation (2) to each pixel). One of ordinary skill in the art will understand that the grayscale generator of other embodiments may use other equations besides equation (2) to generate the grayscale image. The image is then stored in some type of memory by grayscale image storage 1160 and displayed by the image display modules 1170. In some embodiments the storage 1160 is a drive of some kind, in other embodiments the storage 1160 is a computer memory (e.g., video memory of a display device controller). In some embodiments, the storage 1160 is the same as original image storage 1180

The software architecture diagram of FIG. 11 is provided to conceptually illustrate some embodiments. One of ordinary skill in the art will realize that some embodiments use different modular setups that may combine multiple functions into one module though the figure shows multiple modules, and/or may split up functions that the figure ascribes to a single module into multiple modules. For example, in some embodiments, the parameterized path calculator 1120 is part of a larger calculator module that takes in a single value and outputs RGB weights. In some such embodiments, such a calculator module includes a particular color space-to-RGB weighting calculator. Furthermore some such embodiments do and some embodiments don't use weighting normalizers 1140. Embodiments that do use weighting normalizers 1140 use them either as part of the calculator module or separately. As another example, some embodiments combine the control receiver and the image display module into a larger UI module that receives input from a user and outputs displays of interface tools and images.

VIII. GUI

Figure 12A:
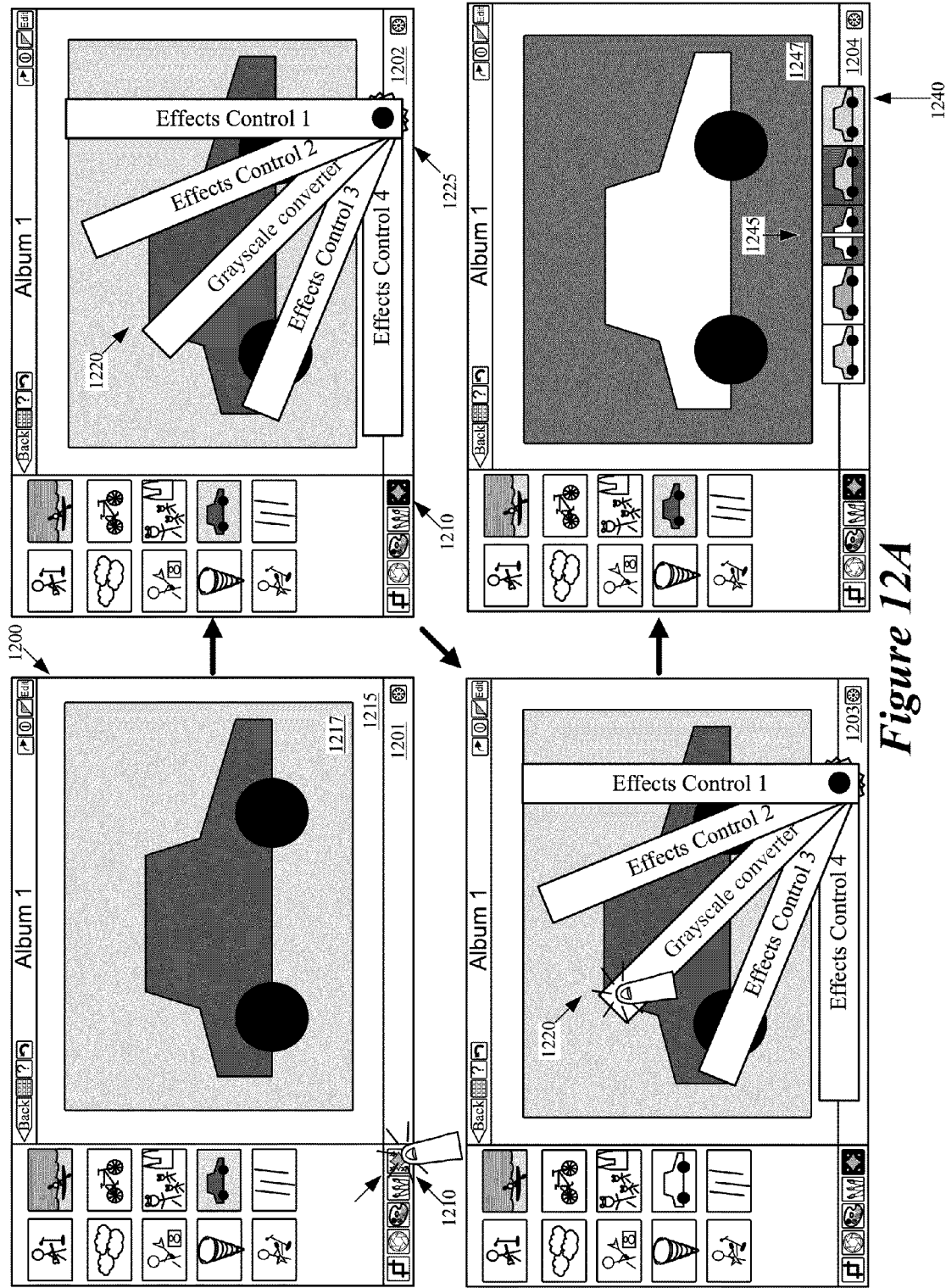
FIG. 12A illustrates a grayscale selection control of some embodiments.

FIG. 12A illustrates a graphical user interface (GUI) 1200 of an image editing application of some embodiments. The GUI allows a user to activate and control a grayscale conversion tool. The GUI is presented in four stages 1201-1204. The GUI includes special effect button 1210, display area 1215, effects control fan 1225, grayscale conversion selector 1220, thumbnail control bar 1240, and slider control 1245. In the first stage 1201, the GUI 1200 is displaying image 1217 in display area 1215. Image 1217 is a color image. Also in stage 1201, a user activates special effect button 1210 (e.g., with a finger tap, or other gesture on a touch sensitive screen or near a near touch sensitive screen). Special effect button 1210 activates effects control fan 1225.

The second stage 1202 shows the effects control fan 1225 open/fanned out, and overlaid upon the image 1217. In some embodiments the effects control fan manifests in the open position. In other embodiments, the effects control fan 1225 manifests folded at the bottom of the screen, then unfolds upward. In still other embodiments, the effects control fan 1225 manifests folded up vertically, then unfolds downward. The effects control fan enables a user to select between various different special effects (e.g., a grayscale effect, a non-photorealistic effect, various gradient effects, etc.). One of the effects accessible through the effects control fan 1225 is a grayscale conversion selector 1220. The grayscale conversion selector 1220 is selected by a user in the third stage 1203 (e.g., by a finger gesture on a device having a touch sensitive or near touch sensitive screen).

The selection of the grayscale conversion selector 1220 in third stage 1203 causes the effects control fan 1225 to be replaced in the display by the thumbnail control bar 1240. The selection also causes color image 1217 to be replaced by grayscale image 1247. In some embodiments the replacement of the effects control fan 1225 is performed by the effects control fan 1225 vanishing and the thumbnail control bar 1240 appearing in its place. In some embodiments, the effects control fan folds down first before vanishing. The thumbnail control bar 1240 of some embodiments displays multiple thumbnail images and a slider control 1245. The slider control 1245 can be moved along the thumbnail control bar 1240. Moving the slider control 1245 to different positions along the thumbnail control bar 1240 provides different grayscale conversion settings to the image editing application.

In some embodiments, each of the thumbnail images indicates what the grayscale image would look like at some setting of the slider control 1245 within the area covered by that thumbnail image. That is, the thumbnails are preview images of the effect performed by that section of the slider control. Moving the slider control 1245 to a different thumbnail or to another part of the same thumbnail will cause the image to change as has been described in relation to the previous figures. In the image editing applications of some embodiments, moving the slider control 1245 to the center of a thumbnail on thumbnail control bar 1240 will generate a full sized grayscale image matching that thumbnail. For example, the image 1247 matches the thumbnail on which slider control 1245 is centered. In image editing applications of other embodiments, moving the slider control 1245 to the left or right side of the thumbnail will generate a full sized grayscale image matching that thumbnail. In image editing applications of still other embodiments, the thumbnail represents the effect of moving the slider control somewhere else within the thumbnail.

Figure 12B:
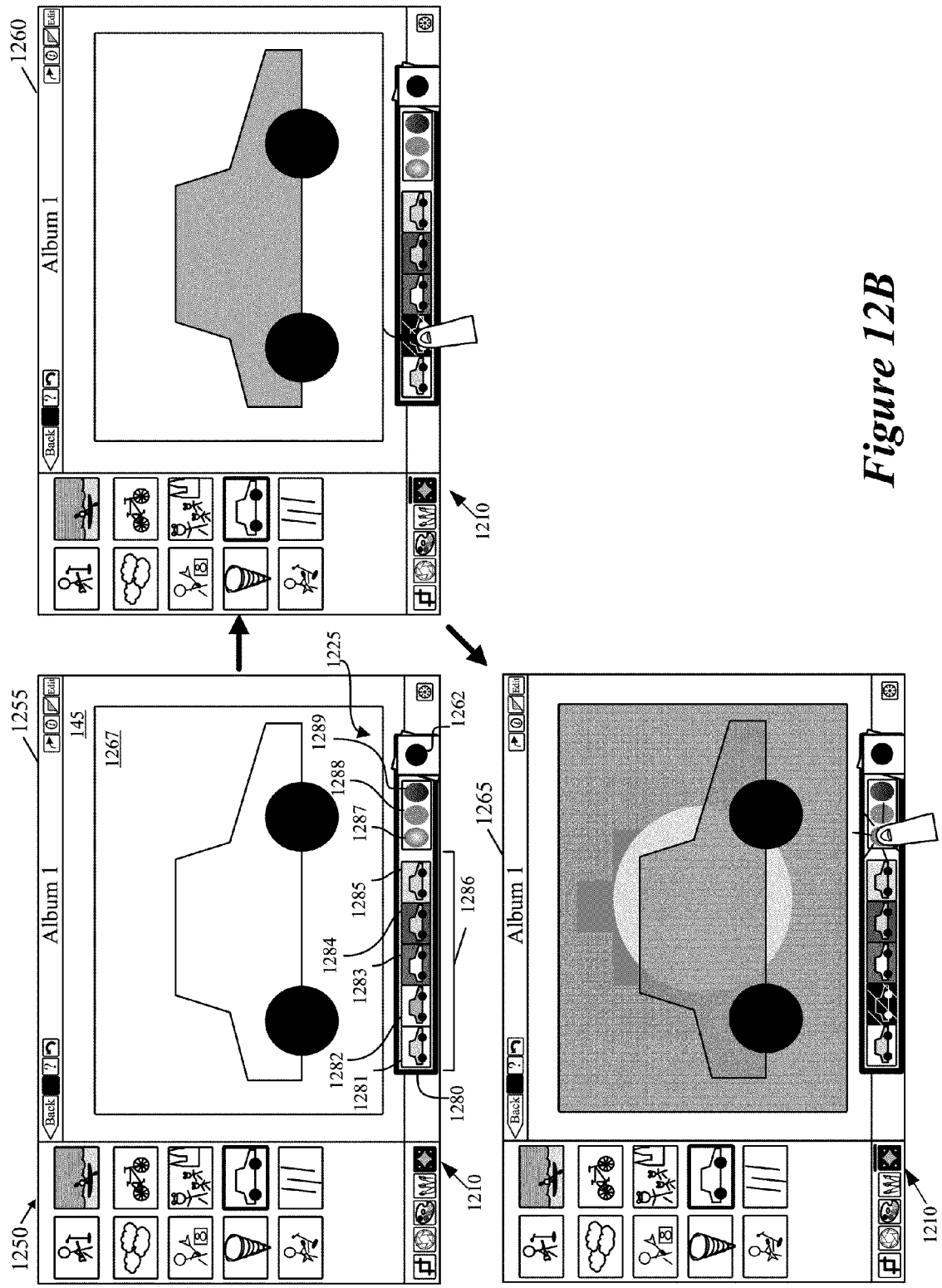
FIG. 12B conceptually illustrates another continuous thumbnail slider control of some embodiments.

FIG. 12B conceptually illustrates another continuous thumbnail slider control 1280 of some embodiments and using the thumbnail slider control 1280 to apply multiple effects to an image. In particular, FIG. 12B illustrates GUI 1250 at three different stages 1255-1265 of applying multiple effects to an image being edited.

The first stage 1255 of the GUI 1250 is similar to the fourth stage 1204 illustrated in FIG. 12A except the effects control fan 1225 in FIG. 12B includes a set of thumbnail slider controls instead of the slider controls being separate from the control fan as shown in stage 1204 of FIG. 12A. As shown in FIG. 12B, a user has activated the effects control fan 1225 (e.g., by selecting the special effect button 1210, or UI item 1262), as indicated by the highlighting of the special effect button 1210. In addition, the user has selected a thumbnail slider control 1280 of the effects control fan 1225 (e.g., by touching the thumbnail slider control 1280 when the set of thumbnail slider controls of the effects control fan 1225 were fanned out).

As shown, the thumbnail slider control 1280 includes a selectable sliding region 1286, a set of thumbnail images 1281-1285 located at different positions along the selectable sliding region 1286, and a set of selectable UI items 1287-1289. The sliding region 1286 is for applying different extents of a grayscale effect associated with the thumbnail slider control 1280 to the image being edited (the image 1267 in this example). Different locations along the horizontal axis of the sliding region 1286 are for applying different grayscale effects to the image being edited.

As shown, each of the thumbnail images 1281-1285 displays a thumbnail image of the image 1267 as modified by a grayscale effect associated with the thumbnail slider control 1280 applied to the thumbnail image. In this example, the location in the middle of each thumbnail image in the selectable sliding region 1286 corresponds to the extent of the effect that is applied to the thumbnail image. This way, each of the thumbnail images 1281-1285 provide the user with a visual indication of the effect that would be applied to the image being edited if the user selected the middle of that thumbnail. Different embodiments use different locations in the selectable sliding region 1286 relative to the thumbnail images 1281-1285 to correspond to the extent of the effect that is applied to the thumbnail images. For instance, some embodiments may use the location near the left of each thumbnail image in the selectable sliding region 1286 to correspond to the extent of the effect that is applied to the thumbnail image.

The set of selectable UI items 1287-1289 are for applying different effects to the image being edited after an effect is applied to the image using the sliding region 1286. In some embodiments, set of selectable UI items 1287-1289 may be used to apply the different effects to the image without having applied effects to the image using the sliding region 1286. Examples of effects include a vignette effect, a sepia effect, a grain effect (i.e., an effect that adds a grainy look to the image), or any other effect for modifying the appearance of the image. While first stage 1255 shows the GUI 1250 displaying the set of UI items 1287-1289, the application of some embodiments provides the UI items 1287-1289 after an effect has been applied using the sliding region 1286.

The second stage 1260 illustrates the GUI 1250 after a location on the sliding region 1286 of the thumbnail slider control 1280 is selected. Here, the user has selected a location near the thumbnail image 1282 to apply the effect associated with the thumbnail slider control 1280 to the image 1267. When a location of the sliding region 1286 is selected, the image editing application displays an indicator 1290 that indicates the selected location and highlights the thumbnail closest to the location. As shown, the user has selected a location near the thumbnail image 1282. When the application receives the selection of this location, the application highlights the thumbnail image 1282 and applies the effect that corresponds with the selected location to the image 1267. As shown in the second stage 1260, the effect applied to the image 1267 is similar to the effect applied to the thumbnail image 1282. In the image editing application of this embodiment, when an effect is applied to the image 1267 the application displays an indicator above the special effect button 1210. In stage 1260, this occurs when the application receives the selection of thumbnail image 1282. The indicator, as shown in stages 1260 and 1265 indicates that at least one effect has been applied to the image 1267.

The third stage 1265 of the GUI 1250 illustrates that the user has selected one of the selectable UI items for applying and additional effect to the image begin edited. As shown, the user has selected the UI item 1287 (e.g., by touching the UI item 1287) to apply a vignette effect to the image 1267. The third stage 1265 also shows that the vignette effect applied to the image as indicated by a darkening of the area around the border of the image 1267. One of ordinary skill in the art will understand that sliders such as described above can be used for the grayscale effects described herein, but also for other effects. Furthermore, one of ordinary skill in the art will understand that vignette, grain, and sepia controls can be used in conjunction with, even on the same blade of the control fan 1225 as a slider that controls grayscale conversion or on the blades of other sliders that control other effects.

IX. Image Viewing, Editing, and Organization Application

Figure 13:
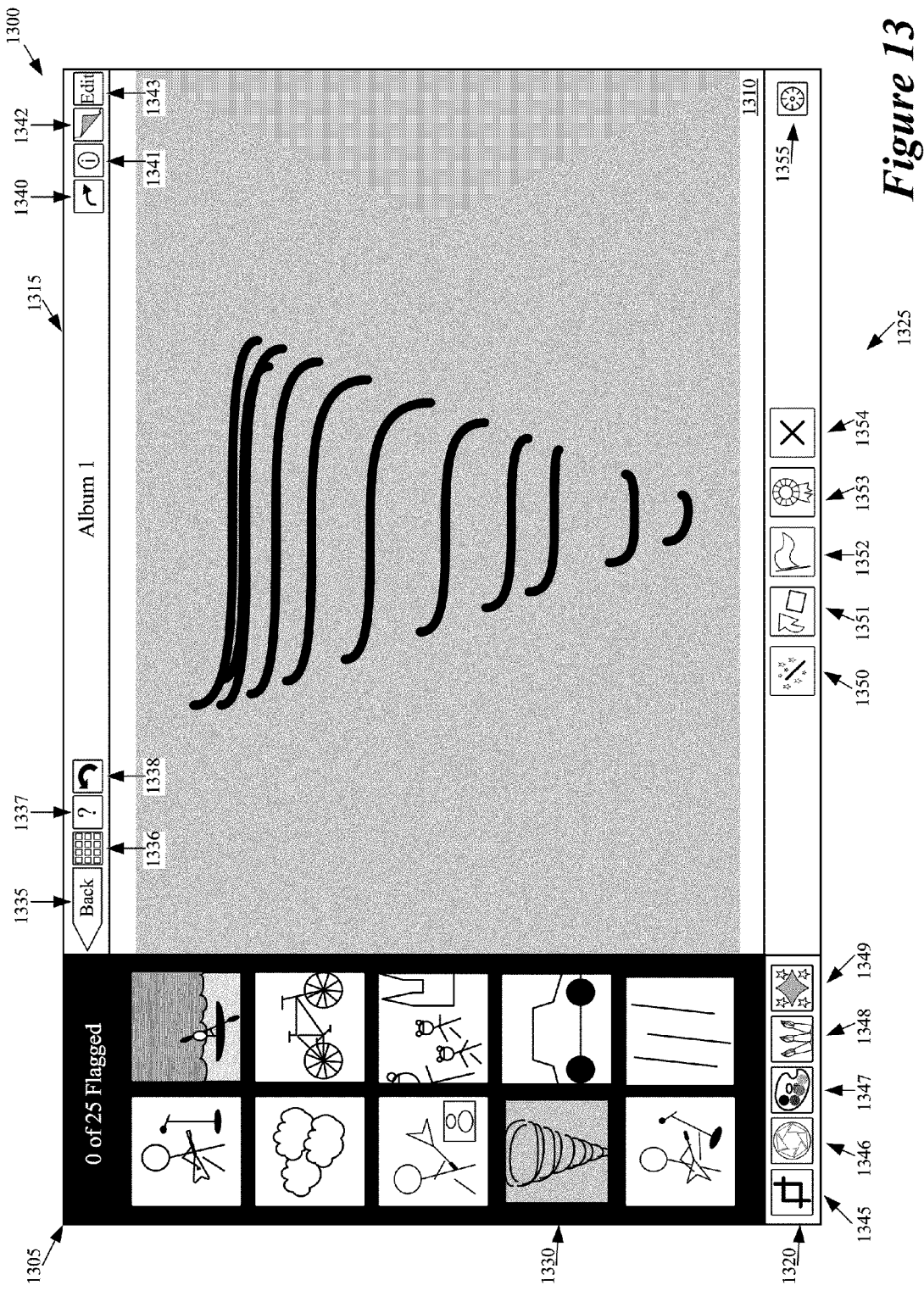
FIG. 13 illustrates a detailed view of a GUI of some embodiments for viewing, editing, and organizing images.
Figure 14:
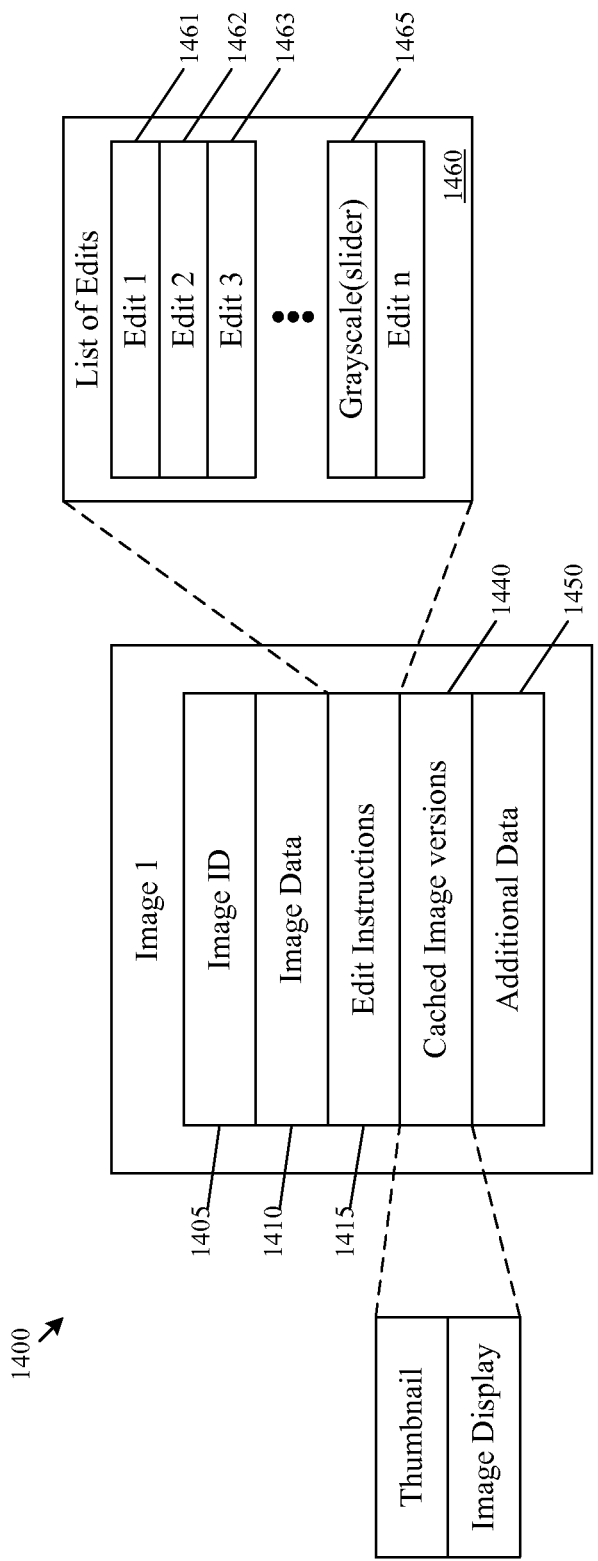
FIG. 14 conceptually illustrates a data structure for an image as stored by the application of some embodiments.

The above-described figures illustrated various examples of the GUI of an image viewing, editing, and organization application of some embodiments. FIG. 13 illustrates a detailed view of a GUI 1300 of some embodiments for viewing, editing, and organizing images. The GUI 1300 will be described in part by reference to FIG. 14, which conceptually illustrates a data structure 1400 for an image as stored by the application of some embodiments.

The data structure 1400 includes an image ID 1405, image data 1410, edit instructions 1415, cached versions 1440 of the image, and any additional data 1450 for the image. The image ID 1405 is a unique identifier for the image, which in some embodiments is used by the collection data structures to refer to the images stored in the collection. The image data 1410 is the actual full-size pixel data for displaying the image (e.g., a series of color-space channel values for each pixel in the image or an encoded version thereof). In some embodiments, this data may be stored in a database of the image viewing, editing, and organization application, or may be stored with the data of another application on the same device. In some embodiments, this additional application is another image organization application that operates on the device, on top of which the image viewing, editing, and organization operates.

Thus, the data structure may store a pointer to the local file associated with the application or an ID that can be used to query the database of another application. In some embodiments, once the application uses the image in a journal or makes an edit to the image, the application automatically makes a local copy of the image file that contains the image data.

The edit instructions 1415 include information regarding any edits the user has applied to the image. In this manner, the application stores the image in a non-destructive format, such that the application can easily revert from an edited version of the image to the original at any time. For instance, the user can apply a grayscale effect to the image, leave the application, and then reopen the application and remove the effect at another time. The edits stored in these instructions may be crops and rotations, full-image exposure and color adjustments, localized adjustments, and special effects, as well as other edits that affect the pixels of the image. Some embodiments store these editing instructions in a particular order, so that users can view different versions of the image with only certain sets of edits applied.

In some embodiments, the edit instructions 1415 are implemented as a list 1460 of edit operations. The list 1460 includes edit operations such as edits 1461, 1462, 1463, and 1465. Each edit operation in the list 1460 specifies the necessary parameters for carrying out the edit operation. For example, the edit operation 1465 in the list 1460 specifies an edit to the image that applies a grayscale effect with grayscale selection parameter as set by the slider value.

In some embodiments, the list 1460 records the sequence of edit operations undertaken by the user in order to create the final edited image. In some embodiments, the list 1460 stores the edit instructions in the order that the image editing application applies the edits to the image in order to generate an output image for display, as some embodiments define a particular order for the different possible edits provided by the application. For example, some embodiments define the grayscale effect as one of the edit operations that are to be applied later than other edit operations such as crop and rotation, full-image exposure, and color adjustment. The list 1460 of some of these embodiments would store the edit instruction for the grayscale effect in a position (i.e., edit 1465) that would be applied later than some of the other edit operations (e.g., edits 1461-1463).

The cached image versions 1440 store versions of the image that are commonly accessed and displayed, so that the application does not need to repeatedly generate these images from the full-size image data 1410. For instance, the application will often store a thumbnail for the image as well as a display resolution version (e.g., a version tailored for the image display area). The application of some embodiments generates a new thumbnail for an image each time an edit is applied, replacing the previous thumbnail. Some embodiments store multiple display resolution versions including the original image and one or more edited versions of the image. In some embodiments, the grayscale thumbnails in the slider 1240 are generated off the cached thumbnail image.

Finally, the image data structure 1400 includes additional data 1450 that the application might store with an image (e.g., locations and sizes of faces, etc.). In some embodiments, the additional data can include Exchangeable image file format (Exif) data, caption data, shared image data, tags on the image or any other types of data. Exif data includes various information stored by the camera that are captured the image such as camera settings, GPS data, timestamps, etc. Caption is a user-entered description of the image. Tags are information that the application enables the user to associate with an image such as marking the image as a favorite, flagged, hidden, etc.

One of ordinary skill in the art will recognize that the image data structure 1400 is only one possible data structure that the application might use to store the required information for an image. For example, different embodiments might store additional or less information, store the information in a different order, etc.

Returning to FIG. 13, the GUI 1300 includes a thumbnail display area 1305, an image display area 1310, a first toolbar 1315, a second toolbar 1320, and a third toolbar 1325. The thumbnail display area 1305 displays thumbnails of the images in a selected collection. Thumbnails are small representations of a full-size image, and represent only a portion of an image in some embodiments. For example, the thumbnails in thumbnail display area 1305 are all squares, irrespective of the aspect ratio of the full-size images. In order to determine the portion of a rectangular image to use for a thumbnail, the application identifies the smaller dimension of the image and uses the center portion of the image in the longer direction. For instance, with a 1600×1200 pixel image, the application would use a 1200×1200 square. To further refine the selected portion for a thumbnail, some embodiments identify a center of all the faces in the image (using a face detection algorithm), then use this location to center the thumbnail portion in the clipped direction. Thus, if the faces in the theoretical 1600× 1200 image were all located on the left side of the image, the application would use the leftmost 1200 columns of pixels rather than cut off 200 columns on either side.

After determining the portion of the image to use for the thumbnail, the image-viewing application generates a low resolution version (e.g., using pixel blending and other techniques) of the image. The application of some embodiments stores the thumbnail for an image as a cached version 1440 of the image. Thus, when a user selects a collection, the application identifies all of the images in the collection (through the collection data structure), and accesses the cached thumbnails in each image data structure for display in the thumbnail display area.

The user may select one or more images in the thumbnail display area (e.g., through various touch interactions described above, or through other user input interactions). The selected thumbnails are displayed with a highlight or other indicator of selection. In thumbnail display area 1305, the thumbnail 1330 is selected. In addition, as shown, the thumbnail display area 1305 of some embodiments indicates a number of images in the collection that have been flagged (e.g., having a tag for the flag set to yes). In some embodiments, this text is selectable in order to display only the thumbnails of the flagged images.

The application displays selected images in the image display area 1310 at a larger resolution than the corresponding thumbnails. The images are not typically displayed at the full size of the image, as images often have a higher resolution than the display device. As such, the application of some embodiments stores a cached version 1440 of the image designed to fit into the image display area. Images in the image display area 1310 are displayed in the aspect ratio of the full-size image. When one image is selected, the application displays the image as large as possible within the image display area without cutting off any part of the image. When multiple images are selected, the application displays the images in such a way as to maintain their visual weighting by using approximately the same number of pixels for each image, even when the images have different aspect ratios.

The first toolbar 1315 displays title information (e.g., the name of the collection shown in the GUI, a caption that a user has added to the currently selected image, etc.). In addition, the toolbar 1315 includes a first set of GUI items 1335-1338 and a second set of GUI items 1340-1343.

The first set of GUI items includes a back button 1335, a grid button 1336, a help button 1337, and an undo button 1338. The back button 1335 enables the user to navigate back to a collection organization GUI, from which users can select between different collections of images (e.g., albums, events, journals, etc.). Selection of the grid button 1336 causes the application to move the thumbnail display area on or off of the GUI (e.g., via a slide animation). In some embodiments, users can also slide the thumbnail display area on or off of the GUI via a swipe gesture. The help button 1337 activates a context-sensitive help feature that identifies a current set of tools active for the user and provides help indicators for those tools that succinctly describe the tools to the user. In some embodiments, the help indicators are selectable to access additional information about the tools. Selection of the undo button 1338 causes the application to remove the most recent edit to the image, whether this edit is a crop, color adjustment, etc. In order to perform this undo, some embodiments remove the most recent instruction from the set of edit instructions 1415 stored with the image.

The second set of GUI items includes a sharing button 1340, an information button 1341, a show original button 1342, and an edit button 1343. The sharing button 1340 enables a user to share an image in a variety of different ways. In some embodiments, the user can send a selected image to another compatible device on the same network (e.g., WiFi or Bluetooth network), upload an image to an image hosting or social media website, and create a journal (i.e., a presentation of arranged images to which additional content can be added) from a set of selected images, among others.

The information button 1341 activates a display area that displays additional information about one or more selected images. The information displayed in the activated display area may include some or all of the Exif data stored for an image (e.g., camera settings, timestamp, etc.). When multiple images are selected, some embodiments only display Exif data that is common to all of the selected images. Some embodiments include additional tabs within the information display area for (i) displaying a map showing where the image or images were captured according to the GPS data, if this information is available and (ii) displaying comment streams for the image on any image sharing websites. To download this information from the websites, the application uses the object ID stored for the image with the shared image data and sends this information to the website. The comment stream and, in some cases, additional information, are received from the website and displayed to the user.

The show original button 1342 enables the user to toggle between the original version of an image and the current edited version of the image. When a user selects the button, the application displays the original version of the image without any of the editing instructions 1415 applied. In some embodiments, the appropriate size image is stored as one of the cached versions 1440 of the image, making it quickly accessible. When the user selects the button again 1342 again, the application displays the edited version of the image, with the editing instructions 1415 applied.

The edit button 1343 allows the user to enter or exit edit mode. When a user has selected one of the sets of editing tools in the toolbar 1320, the edit button 1343 returns the user to the viewing and organization mode, as shown in FIG. 13. When the user selects the edit button 1343 while in the viewing mode, the application returns to the last used set of editing tools in the order shown in toolbar 1320. That is, the items in the toolbar 1320 are arranged in a particular order, and the edit button 1343 activates the rightmost of those items for which edits have been made to the selected image.

The toolbar 1320, as mentioned, includes five items 1345-1349, arranged in a particular order from left to right. The crop item 1345 activates a cropping and rotation tool that allows the user to align crooked images and remove unwanted portions of an image. The exposure item 1346 activates a set of exposure tools that allow the user to modify the black point, shadows, contrast, brightness, highlights, and white point of an image. In some embodiments, the set of exposure tools is a set of sliders that work together in different combinations to modify the tonal attributes of an image. The color item 1347 activates a set of color tools that enable the user to modify the saturation and vibrancy, as well as color-specific saturations (e.g., blue pixels or green pixels) and white balance. In some embodiments, some of these tools are presented as a set of sliders. The brushes item 1348 activates a set of enhancement tools that enable a user to localize modifications to the image. With the brushes, the user can remove red-eye and blemishes, and apply or remove saturation and other features to localized portions of an image by performing a rubbing action over the image. Finally, the effects item 1349 activates a set of special effects that the user can apply to the image. In some embodiments, these effects include grayscale effects, duotone effect, grainy effect, gradients, tilt shifts, non-photorealistic desaturation effects, various filters, etc. In some embodiments, the application presents these effects as a set of items that fan out from the toolbar 1325.

As stated, the UI items 1345-1349 are arranged in a particular order. This order follows the order in which users most commonly apply the five different types of edits. Accordingly, the editing instructions 1415 are stored in this same order, in some embodiments. When a user selects one of the items 1345-1349, some embodiments apply only the edits from the tools to the left of the selected tool to the displayed image (though other edits remain stored within the instruction set 1415).

The toolbar 1325 includes a set of GUI items 1350-1354 as well as a settings item 1355. The auto-enhance item 1350 automatically performs enhancement edits to an image (e.g., removing apparent red-eye, balancing color, etc.). The rotation button 1351 rotates any selected images. In some embodiments, each time the rotation button is pressed, the image rotates 90 degrees in a particular direction. The auto-enhancement, in some embodiments, comprises a predetermined set of edit instructions that are placed in the instruction set 1415. Some embodiments perform an analysis of the image and then define a set of instructions based on the analysis. For instance, the auto-enhance tool will attempt to detect red-eye in the image, but if no red-eye is detected then no instructions will be generated to correct it. Similarly, automatic color balancing will be based on an analysis of the image. The rotations generated by the rotation button are also stored as edit instructions.

The flag button 1352 tags any selected image as flagged. In some embodiments, the flagged images of a collection can be displayed without any of the unflagged images. The favorites button 1353 allows a user to mark any selected images as favorites. In some embodiments, this tags the image as a favorite and also adds the image to a collection of favorite images. The hide button 1354 enables a user to tag an image as hidden. In some embodiments, a hidden image will not be displayed in the thumbnail display area and/or will not be displayed when a user cycles through the images of a collection in the image display area. As discussed above by reference to FIG. 14, many of these features are stored as tags in the image data structure.

Finally, the settings button 1355 activates a context-sensitive menu that provides different menu options depending on the currently active toolset. For instance, in viewing mode the menu of some embodiments provides options for creating a new album, setting a key image for an album, copying settings from one image to another, and other options. When different sets of editing tools are active, the menu provides options related to the particular active toolset.

One of ordinary skill in the art will recognize that the image viewing and editing GUI 1300 is only one example of many possible graphical user interfaces for an image viewing, editing, and organizing application. For instance, the various items could be located in different areas or in a different order, and some embodiments might include items with additional or different functionalities. The thumbnail display area of some embodiments might display thumbnails that match the aspect ratio of their corresponding full-size images, etc.

X. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 15:
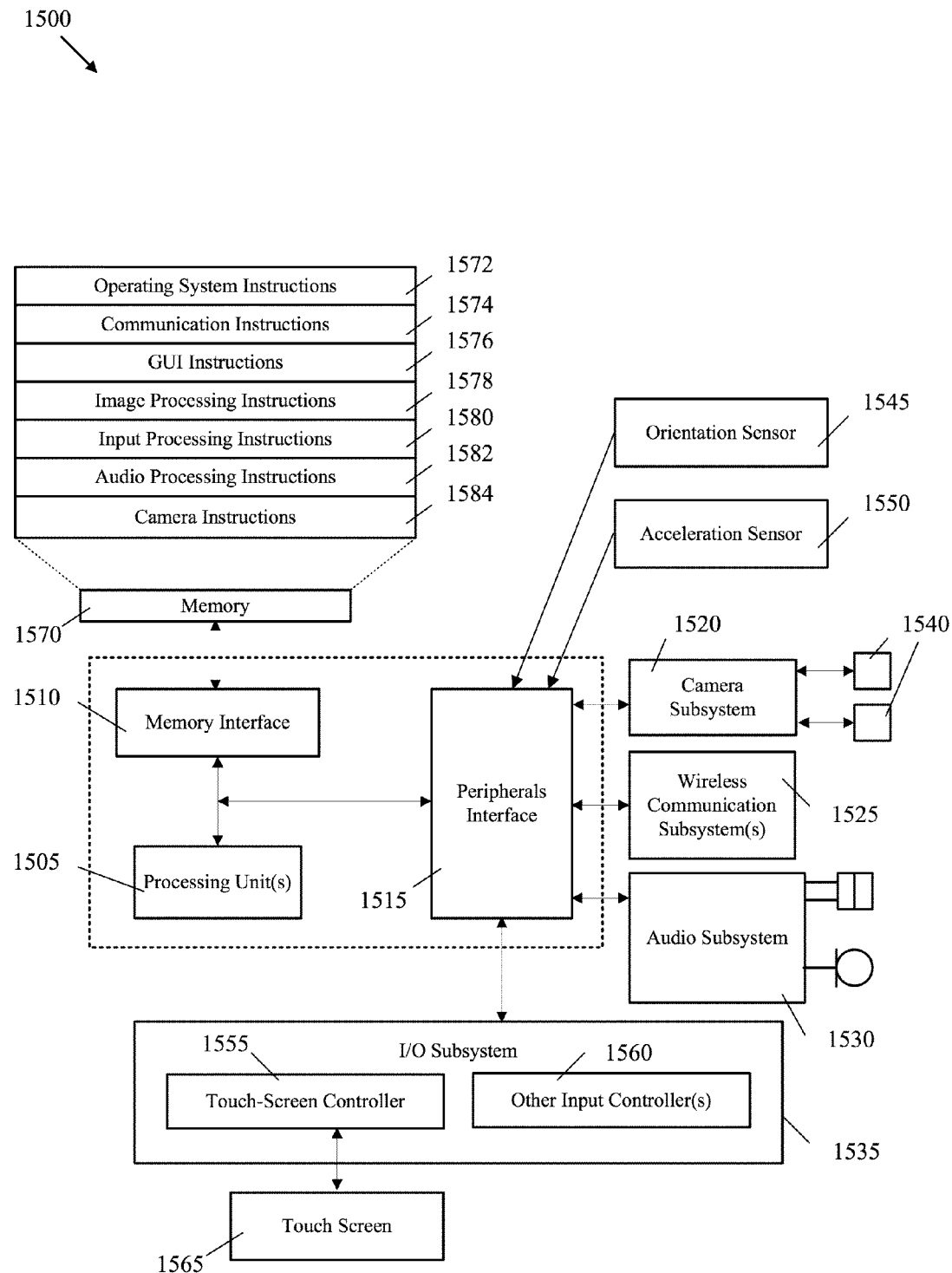
FIG. 15 illustrates an architecture of a mobile computing device of some embodiments.

The image editing and viewing applications of some embodiments operate on mobile devices. FIG. 15 is an example of an architecture 1500 of such a mobile computing device. Examples of mobile computing devices include smartphones, tablets, laptops, etc. As shown, the mobile computing device 1500 includes one or more processing units 1505, a memory interface 1510 and a peripherals interface 1515.

The peripherals interface 1515 is coupled to various sensors and subsystems, including a camera subsystem 1520, a wireless communication subsystem(s) 1525, an audio subsystem 1530, an I/O subsystem 1535, etc. The peripherals interface 1515 enables communication between the processing units 1505 and various peripherals. For example, an orientation sensor 1545 (e.g., a gyroscope) and an acceleration sensor 1550 (e.g., an accelerometer) is coupled to the peripherals interface 1515 to facilitate orientation and acceleration functions.

The camera subsystem 1520 is coupled to one or more optical sensors 1540 (e.g., a charged coupled device (CCD) optical sensor, a complementary metal-oxide-semiconductor (CMOS) optical sensor, etc.). The camera subsystem 1520 coupled with the optical sensors 1540 facilitates camera functions, such as image and/or video data capturing. The wireless communication subsystem 1525 serves to facilitate communication functions. In some embodiments, the wireless communication subsystem 1525 includes radio frequency receivers and transmitters, and optical receivers and transmitters (not shown in FIG. 15). These receivers and transmitters of some embodiments are implemented to operate over one or more communication networks such as a GSM network, a Wi-Fi network, a Bluetooth network, etc. The audio subsystem 1530 is coupled to a speaker to output audio (e.g., to output different sound effects associated with different image operations). Additionally, the audio subsystem 1530 is coupled to a microphone to facilitate voice-enabled functions, such as voice recognition, digital recording, etc.

The I/O subsystem 1535 involves the transfer between input/output peripheral devices, such as a display, a touch screen, etc., and the data bus of the processing units 1505 through the peripherals interface 1515. The I/O subsystem 1535 includes a touch-screen controller 1555 and other input controllers 1560 to facilitate the transfer between input/output peripheral devices and the data bus of the processing units 1505. As shown, the touch-screen controller 1555 is coupled to a touch screen 1565. The touch-screen controller 1555 detects contact and movement on the touch screen 1565 using any of multiple touch sensitivity technologies. The other input controllers 1560 are coupled to other input/control devices, such as one or more buttons. Some embodiments include a near-touch sensitive screen and a corresponding controller that can detect near-touch interactions instead of or in addition to touch interactions.

The memory interface 1510 is coupled to memory 1570. In some embodiments, the memory 1570 includes volatile memory (e.g., high-speed random access memory), non-volatile memory (e.g., flash memory), a combination of volatile and non-volatile memory, and/or any other type of memory. As illustrated in FIG. 15, the memory 1570 stores an operating system (OS) 1572. The OS 1572 includes instructions for handling basic system services and for performing hardware dependent tasks.

The memory 1570 also includes communication instructions 1574 to facilitate communicating with one or more additional devices; graphical user interface instructions 1576 to facilitate graphic user interface processing; image processing instructions 1578 to facilitate image-related processing and functions; input processing instructions 1580 to facilitate input-related (e.g., touch input) processes and functions; audio processing instructions 1582 to facilitate audio-related processes and functions; and camera instructions 1584 to facilitate camera-related processes and functions. The instructions described above are merely exemplary and the memory 1570 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 15 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 15 may be split into two or more integrated circuits.

B. Computer System

Figure 16:
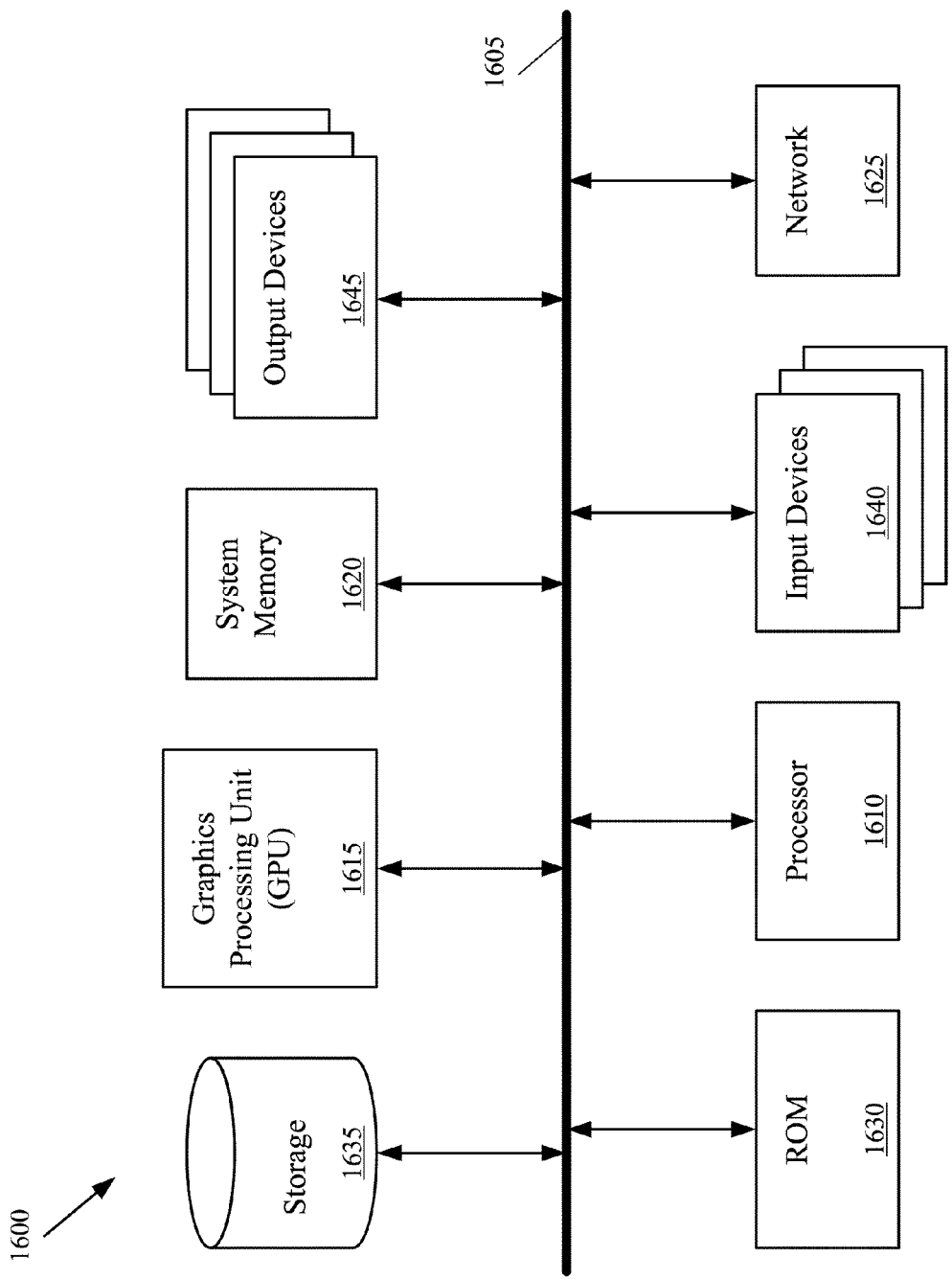
FIG. 16 conceptually illustrates an electronic system with which some embodiments are implemented.

FIG. 16 conceptually illustrates another example of an electronic system 1600 with which some embodiments of the invention are implemented. The electronic system 1600 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1600 includes a bus 1605, processing unit(s) 1610, a graphics processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the GPU 1615, the system memory 1620, and the permanent storage device 1635.

From these various memory units, the processing unit(s) 1610 retrieves instructions to execute and data to process in order to execute the processes of the invention. The processing unit(s) may be a single processor or a multi-core processor in different embodiments. Some instructions are passed to and executed by the GPU 1615. The GPU 1615 can offload various computations or complement the image processing provided by the processing unit(s) 1610. In some embodiments, such functionality can be provided using CoreImage's kernel shading language.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash memory device, etc., and its corresponding drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor needs at runtime. In some embodiments, the invention's processes are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 3, 4A, and 4B) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, controls for setting the single value used to control the grayscale conversion are shown as slider controls in FIGS. 2, 6, 7, 8, 9, 10, and 12. The sliders of such embodiments provide a visual indication of a setting value as a knob is slid along the slider to set a value for the slider. However, in some embodiments, the slider controls shown in any of those figures could be replaced with any other control capable of receiving a value (e.g., a single value), such as a vertical slider control, a pull down menu, a value entry box, an incremental tool activated by keyboard keys, other range related UI controls (e.g., dials, buttons, number fields, and the like), etc. Similarly, the slider controls of those figures are either depicted as being set with a finger gesture (e.g., placing, pointing, tapping one or more fingers) on a touch sensitive screen or simply shown in a position without any indication of how they were moved into position. One of ordinary skill in the art will understand that the controls of FIGS. 2, 6, 7, 8, 9, 10, and 12 can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A method of generating a grayscale image, the method comprising
receiving a single value through a user interface control;
from the single value, computing a plurality of different grayscale weighting values for converting a color image to the grayscale image, wherein different settings for the single value result in different proportionalities of each of the grayscale weighting values to each of the other grayscale weighting values; and
generating the grayscale image by applying the plurality of different grayscale weighting values to the color image, wherein said receiving, computing and generating are performed by an electronic device.

2. The method of claim 1, wherein computing the plurality of different grayscale weighting values comprises determining a plurality of coordinates in a color space.

3. The method of claim 2, wherein the single value identifies a point on a parameterized path in the color space.

4. The method of claim 3, wherein the parameterized path is a closed circle.

5. The method of claim 1, wherein generating the grayscale image comprises, for each of a plurality of pixels in the color image:
multiplying a first grayscale weighting value by a first color component value of the pixel;
multiplying a second grayscale weighting value by a second color component value of the pixel;
multiplying a third grayscale weighting value by a third color component value of the pixel; and
adding together the multiplication products to determine a grayscale value for a corresponding pixel in the grayscale image.

6. The method of claim 1 further comprising normalizing the plurality of different grayscale weighting values before generating the grayscale image.

7. The method of claim 1 further comprising partially normalizing the plurality of different grayscale weighting values before generating the grayscale image.

8. The method of claim 7, wherein partially normalizing the plurality of different grayscale weighting values comprises generating a normalized plurality of grayscale weighting values and taking a weighted average of the normalized plurality of grayscale weighting values and the non-normalized plurality of grayscale weighting values.

9. A non-transitory machine readable medium storing a program which when executed by at least one processing unit generates a grayscale image, the program comprising sets of instructions for:
receiving a single value from a control;
determining a plurality of color values based on the single value;
converting the plurality of color values into a plurality of grayscale weighting values, wherein different settings for the single value result in different proportionalities of each of the grayscale weighting values to each of the other grayscale weighting values; and
applying the plurality of grayscale weighting values to the pixels of the color image to calculate pixel values for the grayscale image.

10. The non-transitory machine readable medium of claim 9, wherein the plurality of color values are defined in a luminance/chrominance space.

11. The non-transitory machine readable medium of claim 10, wherein the luminance/chrominance space is a YIQ space.

12. The non-transitory machine readable medium of claim 10, wherein the plurality of grayscale weighting values is a plurality of red-green-blue (RGB) weighting values.

13. An electronic device comprising:
a set of processing units; and
a non-transitory machine readable medium storing a program which when executed by at least one processing unit implements an image-editing application, the prom comprising sets of instructions for:
mapping a single value, received through a user interface of the image editing application, into a plurality of values in a first color space;
converting the plurality of values in the first color space to a plurality of weighting values in a second color space, wherein the second color space is a color space of a color image, wherein different settings for the single value result in different proportionalities of each of the weighting values to each of the other weighting values; and
converting the color image to a grayscale image according to the plurality of weighting values.

14. The electronic device of claim 13, wherein the set of instructions for mapping a single value comprises a set of instructions for using a parameterized path calculator for converting the single value into a location on a parameterized path in the first color space.

15. The electronic device of claim 14, wherein the first color space is a YIQ color space.

16. The electronic device of claim 13, wherein the second color space is a red-green-blue color space and the plurality of weighting values comprises a red weighting value, a green weighting value, and a blue weighting value.

17. The electronic device of claim 16, wherein the set of instructions for converting the color image to a grayscale image comprises a set of instructions for calculating a grayscale value for each of a plurality of pixels in the grayscale image by multiplying a red component value of the corresponding pixel in the color image by the red weighting value, multiplying the green component value of the corresponding pixel in the color image by the green weighting value, multiplying a blue component value of the corresponding pixel in the color image by the blue weighting value, and summing the multiplication products.

18. The electronic device of claim 13, wherein the set of instructions for converting the plurality of values comprises a set of instructions for using a weighting normalizer module for the conversion.

19. The electronic device of claim 18, wherein the weighting normalizer module is for partially normalizing the plurality of weighting values.

20. The electronic device of claim 18, wherein the weighting normalizer module divides each of the weighting values in the plurality of weighting values by the sum of the values of the plurality of weighting values to generate normalized weighting values.

21. A non-transitory machine readable medium storing a program for generating a grayscale image, the program comprising sets of instructions for:
receiving a single value that corresponds to a particular location along a path through a first color space;
converting the single value into a plurality of different grayscale weighting values in a second color space, wherein different settings for the single value result in different proportionalities of each of the grayscale weighting values to each of the other grayscale weighting values; and generating the grayscale image from a color image based on the plurality of different grayscale weighting values.

22. The non-transitory machine readable medium of claim 21, wherein the set of instructions for receiving the single value comprises a set of instructions for detecting a slider setting.

23. The non-transitory machine readable medium of claim 22, wherein the set of instructions for detecting a slider setting comprises a set of instructions for receiving a gestural command.

24. The non-transitory machine readable medium of claim 21, wherein the program further comprises a set of instructions for receiving a selection of a grayscale conversion tool from among a plurality of image effects tools.

25. The non-transitory machine readable medium of claim 22, wherein the set of instructions for detecting a slider setting comprises a set of instructions for receiving a click-drag-and-release command from a cursor control device.

* * * * *